US010089891B2

(12) United States Patent
Agrawal et al.

(10) Patent No.: US 10,089,891 B2
(45) Date of Patent: Oct. 2, 2018

(54) MONITORING SCHEDULED TURNAROUND ACTIVITIES AND ALERTING ON TIME DEVIATION OF SCHEDULED TURNAROUND ACTIVITIES

(71) Applicants: AIRBUS GROUP INDIA PRIVATE LIMITED, Bangalore (IN); AIRBUS (S.A.S.), Blagnac (FR); AIRBUS OPERATIONS (S.A.S.), Toulouse (FR)

(72) Inventors: Ashutosh Agrawal, Bangalore (IN); Georges Myczkowski, Blagnac (FR); Brendan Clarke, Toulouse (FR); Nicolas Landrin, Toulouse (FR); Lucas Babelaere, Toulouse (FR); Nathalie Willig, Blagnac (FR); Diego Alonso-Tabares, Blagnac (FR)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 46 days.

(21) Appl. No.: 15/206,332

(22) Filed: Jul. 11, 2016

(65) Prior Publication Data

US 2017/0011638 A1 Jan. 12, 2017

(30) Foreign Application Priority Data

Jul. 10, 2015 (IN) .......................... 3547/CHE/2015

(51) Int. Cl.
*G08G 5/00* (2006.01)
*G06Q 10/06* (2012.01)

(52) U.S. Cl.
CPC ......... *G08G 5/0095* (2013.01); *G06Q 10/063* (2013.01); *G06Q 10/0631* (2013.01);
(Continued)

(58) Field of Classification Search
CPC ............... G08G 5/0095; G06Q 10/063; G06Q 10/0631; G06Q 10/06312; G06Q 10/06315; G06Q 10/06316
See application file for complete search history.

(56) References Cited

U.S. PATENT DOCUMENTS 6,216,109 B1 * 4/2001 Zweben et al. ........ G06Q 10/04
705/7.12
6,463,383 B1 * 10/2002 Baiada et al. ....... G08G 5/0095
701/120

(Continued)

*Primary Examiner* — Dale W Hilgendorf
(74) *Attorney, Agent, or Firm* — Prakash Nama; Global IP Services, PLLC

(57) ABSTRACT

A system for monitoring scheduled turnaround activities and alerting on time deviation from the scheduled turnaround activities is disclosed. The system includes a ground computing station system, an aircraft on-board system, a cloud, and user interface. The cloud is communicatively coupled to the ground station computing system and the aircraft on-board system. The cloud includes processor and memory. The memory includes an analytics module to obtain actual start and end time stamps associated with scheduled turnaround activities, from touchdown to takeoff of an aircraft, from aircraft on-board systems and a ground station system. The analytics module to determine time deviation of scheduled turnaround activities by analyzing the obtained actual start and end time stamps. The user interface to present each scheduled turnaround activity and determined time deviation of the scheduled turnaround activities.

19 Claims, 20 Drawing Sheets

(52) U.S. Cl.
CPC . *G06Q 10/06312* (2013.01); *G06Q 10/06315* (2013.01); *G06Q 10/06316* (2013.01)

(56) References Cited

U.S. PATENT DOCUMENTS

| | | | | |
|---|---|---|---|---|
| 9,153,138 B1* | 10/2015 | Jewett et al. | ........ | G08G 5/0095 |
| 2003/0191678 A1* | 10/2003 | Shetty et al. | .......... | G06Q 10/06 |
| | | | | 705/7.13 |
| 2007/0156635 A1* | 7/2007 | Tatton et al. | .......... | G06N 5/025 |
| | | | | 706/45 |
| 2009/0125357 A1* | 5/2009 | Vannette et al. | ....... | G06Q 10/06 |
| | | | | 705/7.12 |
| 2015/0221225 A1* | 8/2015 | Peterson et al. | ......... | G08G 5/06 |
| | | | | 701/120 |

\* cited by examiner

MONITORING SCHEDULED TURNAROUND ACTIVITIES AND ALERTING ON TIME DEVIATION OF SCHEDULED TURNAROUND ACTIVITIES

RELATED APPLICATIONS

Benefit is claimed under 35 U.S.C. 119(a)-(d) to Foreign Application Serial No. 3547/CHE/2015 filed in India entitled "MONITORING SCHEDULED TURNAROUND ACTIVITIES AND ALERTING ON TIME DEVIATION OF SCHEDULED TURNAROUND ACTIVITIES", filed on Jul. 10, 2015 by AIRBUS GROUP INDIA PRIVATE LIMITED, AIRBUS (S.A.S.) and AIRBUS OPERATIONS (S.A.S.) which is herein incorporated in its entirety by reference for all purposes.

A reference is made to an U.S. application Ser. No. 14/723,503, published as US 2015-0348422 A1 on Dec. 3, 2015 and entitled "System and method for providing an optimized aircraft turnaround schedule", the contents of which are incorporated herein by reference.

TECHNICAL FIELD

Embodiments of the present subject matter generally relate to turnaround activities for aircrafts, and more particularly, to monitoring of scheduled turnaround activities for the aircrafts.

BACKGROUND

Nowadays, airline operators are focusing on minimizing time taken to perform turnaround activities during entire journey of aircrafts to reduce the cost of the journey. Several complicated turnaround activities may be coordinated between airports and the airline operators during the journey of the aircrafts. Time consumed to perform the turnaround activities may be gathered from various sources, such as airline operators and/or ground handlers that monitor the turnaround activities from touchdown to takeoff of the aircraft. The airline operators and the ground handlers may manually record the start and end times for turnaround activities which may be affected by manual error which may cause incorrect recording of the time taken to perform turnaround activities.

SUMMARY

A method for monitoring scheduled turnaround activities and alerting on time deviation of the scheduled turnaround activities is disclosed. Actual start and end time stamps associated with each scheduled turnaround activity is obtained. The actual start and end time stamps are obtained from at least one of an aircraft on-board system and a ground station system from touchdown to takeoff of an aircraft. Further, time deviation of each scheduled turnaround activity is determined by analyzing the obtained actual start and end time stamps associated with each scheduled turnaround activity. Also, each scheduled turnaround activity and determined time deviation of each scheduled turnaround activity are presented. In one example, each scheduled turnaround activity and determined time deviation of each scheduled turnaround activity are presented on at least one user interface.

In one embodiment, a system to monitor scheduled turnaround activities and alerting on time deviation from the scheduled turnaround activities is described. The system includes a ground station system, an aircraft on-board system, and an analytics module. The analytics module obtains actual start and end time stamps associated with each scheduled turnaround activity from at least one of an aircraft on-board system and a ground station system, from touchdown to takeoff of an aircraft. The analytics module may further determine time deviation of at least one scheduled turnaround activity by analyzing the obtained actual start and end time stamps associated with each scheduled turnaround activity. Also, each scheduled turnaround activity and determined time deviation of each scheduled turnaround activity may be presented on at least one user interface. In one example, the analytics module may reside within a cloud communicating with the ground station system and the aircraft on-board system. In another example, the analytics module may reside either within the ground station system or within the aircraft on-board system.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for monitoring scheduled turnaround activities and alerting on time deviation of the scheduled turnaround activities are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

During journey of an aircraft, scheduled turnaround activities may be monitored from touchdown to takeoff of the aircraft. The scheduled turnaround activities, for example, may include ground handling activities and aircraft activities. Further, the ground handling activities, for example, may include refueling, cargo door open, cargo door close, toilet drain cycle, water filling, and the like. Similarly, the aircraft activities, for example, may include touchdown, braking start, brake fans start, brake fans stop, breaking release, parking brake on, engine stop, aircraft arrival, aircraft docking, aircraft pull away, takeoff braking start, reaching taxi speed, engine stops, and the like. In accordance with an example of the present disclosure, a system monitors scheduled turnaround activities by leveraging data collected from the aircraft or from dedicated portable electronic devices operated in and around the aircraft. The system provides support through a set of advisory messages or alarms in order to minimize schedule disruption due to unexpected events. By using the advisory messages or alarms, operating conditions (e.g., environmental conditions, aircraft status) is attained and properly shared between to personnel in the aircraft and/or operational control center (OCC).

An example system and method for monitoring scheduled turnaround activities and alerting on time deviation of the scheduled turnaround activities will now be described with reference to FIG. 1 through FIG. 20.

Figure 1:
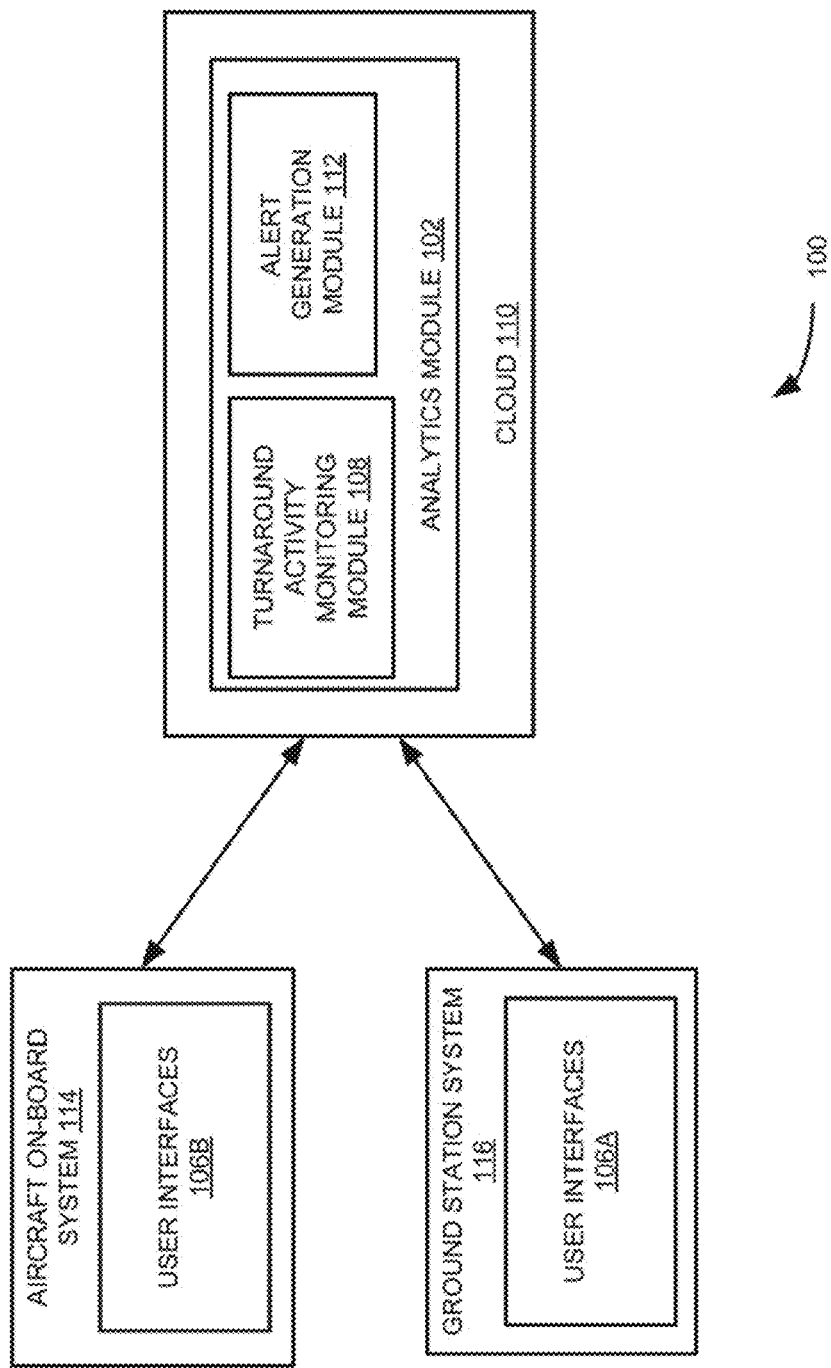
FIG. 1 illustrates a block diagram of an example system for monitoring scheduled turnaround activities and alerting on time deviation of the scheduled turnaround activities.

FIG. 1 illustrates an example system 100 for monitoring scheduled turnaround activities and alerting on time deviation of the scheduled turnaround activities. In one example, the system 100 may include an aircraft on-board system 114, a ground station system 116, and an analytics module 102. For the purpose of explanation, the analytics module 102 is illustrated to be present on a cloud 110. In one embodiment, the analytics module 102 may also be present within the aircraft onboard system 114 and/or a ground station system 116. The aircraft on-board system 114 may include, for example, aircraft condition monitoring system (ACMS), cabin intercommunication data system (CIDS), cabin video monitoring system (CVMS), and the like. Similarly, the ground station system 116 may include, for example, systems at airport, ground handling units, airline enterprise systems and the like. Further, the aircraft onboard system 114 and the ground station system 116 may include one or more interfaces 106A, 106B respectively.

The aircraft onboard system 114 and the ground station system 116 may be communicatively connected to the cloud 110 via a communication network. For example, the communication network may include one of an Internet, an airport Wi-Fi™, a mobile network, an in-flight Internet and the like. Further, the one or more interfaces 106B may include an airline enterprise interface, an airport interface, a ground handling interface, and other such interfaces. In one example, the aircraft onboard system 114 and the ground station system 116 may receive on-board data and ground station data respectively and generate actual start and end time stamps for scheduled turnaround activities for which the on-board data and ground station data are received. Further, the aircraft onboard system 114 and the ground station system 116 may send the actual start and end time stamps for scheduled turnaround to the cloud 110 through the communication network.

Further, the analytics module 102 may include a turnaround activity monitoring module 108 which may monitor time taken for each scheduled turnaround activity from touchdown to takeoff of the aircraft. In one example, the scheduled turnaround activity monitoring module 108 may monitor time taken for each scheduled turnaround activity by obtaining the actual start and end time stamps associated with each scheduled turnaround activity from the aircraft on-board system 114 and/or the ground station system 116.

Figure 2:
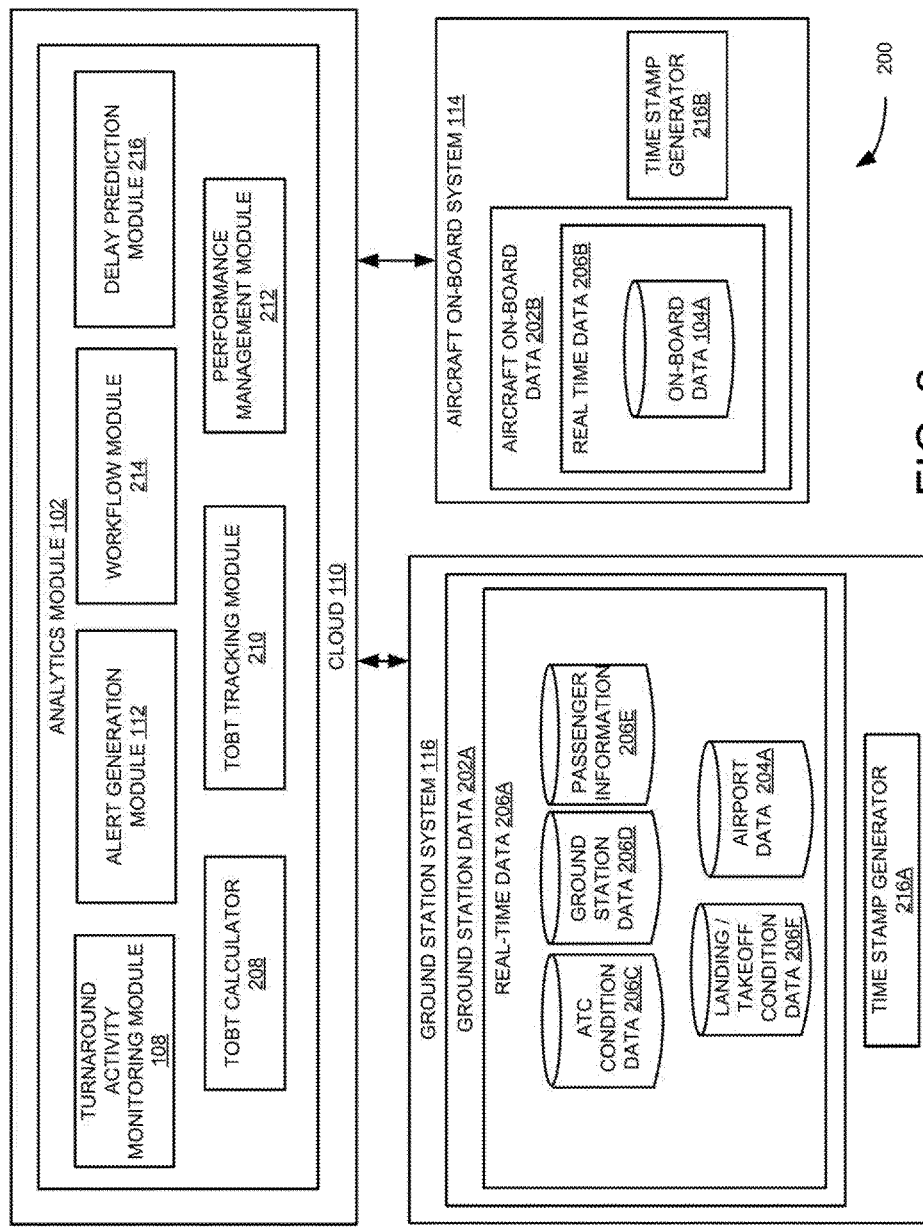
FIG. 2 illustrates an architecture of an example analytics module and its interaction with aircraft on-board system and ground station system to obtain actual start and end time stamps associated with each scheduled turnaround activity.

Referring now to FIG. 2, which illustrates an example architecture 200 of an analytics module 102 and its interaction with the aircraft on-board system 114 and the ground station system 116 to obtain actual start and end time stamps associated with each scheduled turnaround activity. The architecture 200 may include time stamp generators 216A and 216B within the ground station system 116 and aircraft on-board system 114, respectively. The time stamp generators 216A and 216B generate the actual start and end time stamps based on real-time data 206A and 206B associated with each scheduled turnaround activity. For example, the actual start and end time stamps may be generated based on time taken to cool the brakes. In one example, the real time data 206A and 206B may be understood as data that is produced immediately after each scheduled turnaround activities without any delay in the timeliness. In one example, the real-time data 206A and 206B may be received by the aircraft on-board system 114 and/or ground station system 116 for generating the actual start and end time stamps based on real-time data 206A and 206B associated with each scheduled turnaround activity by the time stamp generators 216A and 216B.

Further, the real-time data, for example, may include airport data 204A, on-board data 104A, air traffic control (ATC) condition data 206C, ground station data 206D, passenger information 206E, and landing or takeoff condition data 206F. In one example, the airport data 204A may include a terminal number, a gate number, an exit gate number and so on. Also, the on-board data 104A may include, for example, time taken for touchdown, braking start, taxi speed reached, brake fans start, brake fans stop, braking release, parking brake on, APU start/GPU connect, engine stop, skybridge/ladder connect, passenger doors open, first passenger de-boarding (obtained from cabin video feed), last passenger de-boarding (obtained from cabin video feed), cleaning finish, first passenger boarding (obtained from cabin video feed), last passenger boarding (obtained from cabin video feed), passenger door closed, forward cargo door open, rear end cargo door open, forward cargo door close, rear end cargo door close, refueling start, refueling stop, catering door open, catering door closed, portable water filling start, portable water filling stop, toilet drain cycle start, toilet drain cycle stop, maintenance activity start, maintenance activity stop, parking brake release, engine start, APU/GPU stop, pushback start, brake fans start, brake fans stop, temporary stops during taxi, brake on, throttle takeoff setting and the like.

Further, the landing or takeoff condition data 206F may include, for example, weather conditions, runway conditions and so on. In addition, the ATC condition data 206C may include, for example, available slots, allocated gates and so on. Also, the ground station data 206D may include, for example, available ground handling units type of ground handling units for performing scheduled turnaround activities, number of ground handling units, and so on. Moreover, the passenger information 206E may include, for example, number of passengers, baggage weight, information of special need persons (e.g., physically impaired persons), and so on.

Further, the actual start and end time stamps may be obtained by the analytics module 102 from the on-board system 114 and ground station system 116, in one embodiment. The analytics module 102 may then analyze the obtained actual start and end time stamps to determine time deviation of each scheduled turnaround activities. In one embodiment, the analytics module 102 may simultaneously analyze the obtained start and end time stamps of more than one activity to determine deviation from the scheduled turnaround activities. In one example, the time deviation may be determined by comparing the actual start and end time stamps with scheduled start and end time stamps of each scheduled turnaround activities.

Furthermore, after analyzing the obtained actual start and end time stamps, the data related to time deviation and the scheduled turnaround activities may be sent to the one or more interfaces 106. The one or more interfaces 106 may present the time deviation along with the scheduled turnaround activities, upon receiving the data related to time deviation and the scheduled turnaround activities. In one embodiment, the analytics module 102 may include a performance management module 212. The performance management module 212 may provide a summary view of the time deviation and the scheduled turnaround activities on the one or more interfaces 106A and 106B. In one example, the summary view may include Gantt chart. The summary view allows monitoring of various scheduled turnaround activities at one glance. The summary view may be stored for statistical analysis. The statistical analysis may be performed by presenting statistical result as graphs which may be used for performance benchmarking of ground handlers and scheduled turnaround activity optimization.

In one embodiment, the analytics module 102 may include a delay prediction module 216. The delay prediction module 216 may determine an aircraft departure delay. The aircraft departure delay may be understood as delay in scheduled departure time of the aircraft. The aircraft departure delay may be caused by one or more scheduled turnaround activities. Further, the delay prediction module 216 may determine the aircraft departure delay by analyzing the time deviation of the scheduled turnaround activities. The aircraft departure delay predicted by the delay prediction module 216 may be presented on the one or more user interfaces 106 for notifying the users of the one or more interface 106 about the aircraft departure delay, so that the user can take an appropriate action for minimizing the aircraft departure delay. For example, the users may perform certain scheduled turnaround activities parallelly for minimizing the aircraft departure delay.

In one example, the presented time deviation and the scheduled turnaround activities may be utilized by users of the one or more interface 106 for deciding on the improvement in time taken by a scheduled turnaround activity responsible for providing a delay in overall turnaround time from touchdown to takeoff of the aircraft. For example, an airline enterprise system may use the time deviation of the scheduled turnaround activities to determine taxi-in performance of the aircraft in the airport.

Further, the analytics module 102 may include a target off block time (TOBT) calculator 208 and a TOBT tracking module 210. The TOBT calculator 208 may estimate a TOBT for the aircraft based on estimated time of arrival (ETA) of the aircraft. In one example, the ETA may be estimated by the airport personnel. Further, the TOBT tracking module 210 may dynamically revise the estimated TOBT for the aircraft based on the actual time of arrival of the aircraft and the progress of the optimized aircraft turnaround schedule after arrival of the aircraft. For example, if the ETA of the aircraft deviates or if a delay is predicted in the scheduled turnaround activities, then the ETA is revised based on the deviation or delay.

In one embodiment, the analytics module 102 may include an alert generation module 112. The alert generation module 112 may generate an alert if there is time deviation of the scheduled turnaround activities. The alert may indicate, for example, aircraft late arrival, delayed and not started activities, started but late running activities, late finishing of scheduled turnaround activities, overlapping of dependent scheduled turnaround activities, delay prediction, aircraft ready for departure, and late aircraft departure. In one embodiment, the analytics module 102 may further include a workflow module 214. The workflow module 214 may help in flow of all the information/data 202A and 202B within the system 100.

Figure 3:
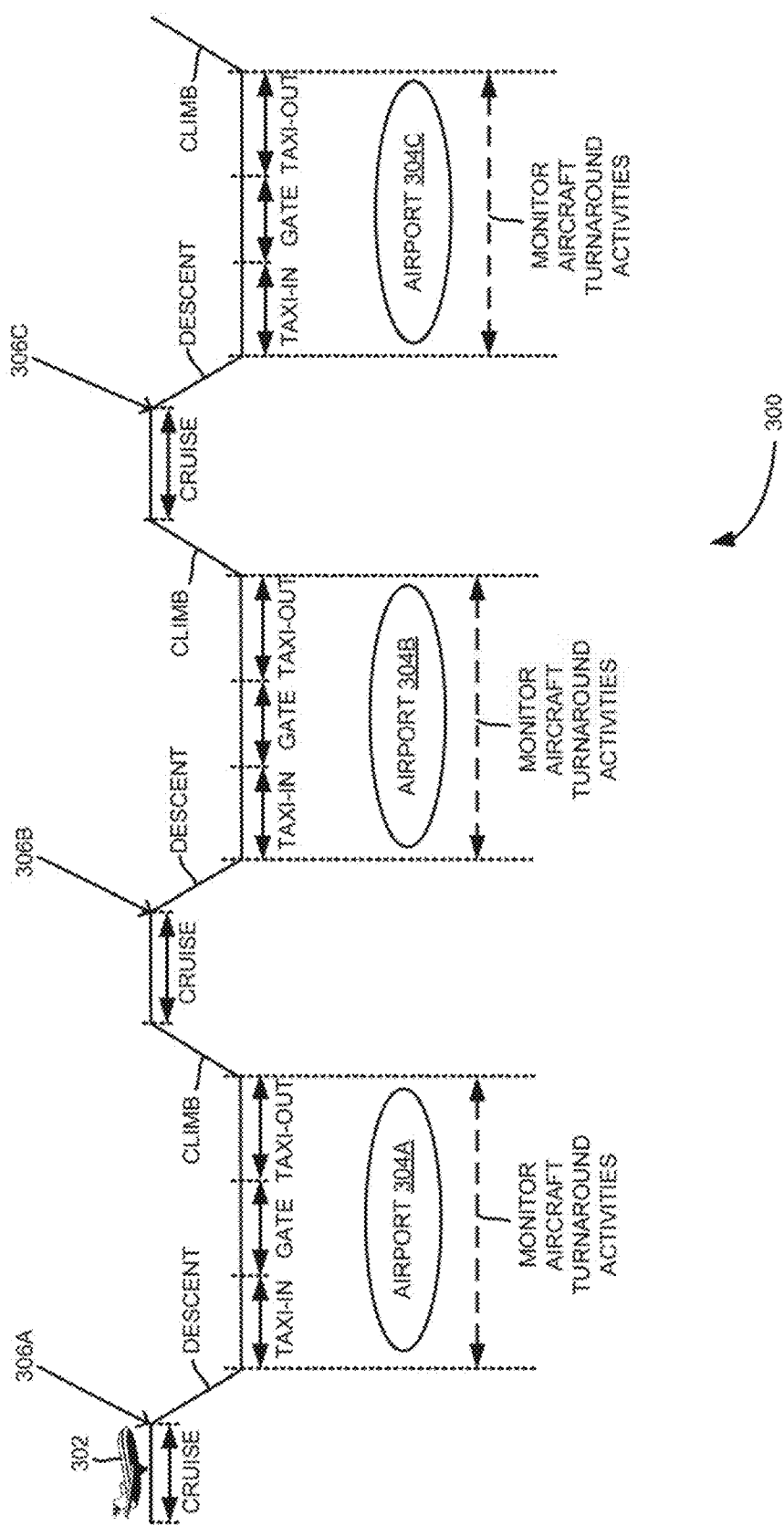
FIG. 3 illustrates a timing diagram showing various stages during journey of an aircraft, according to one embodiment.

Referring now to FIG. 3, which illustrates an example timing diagram 300 showing various stages during journey of an aircraft 302. The example timing diagram 300 shows the journey of the aircraft 302 through airports 304A to 304C. For example, the various stages during journey of the aircraft 302 may be cruise, descent, taxi-in, at gate, taxi-out and climb stage of the aircraft at the each of the airports 304A-304C. Furthermore, 306A-306C may indicate locations in the journey of the aircraft 302 when the aircraft on-board system sends data associated with turnaround scheduled activity related to the aircraft 302 to one or more ground handling units associated with the airports 304A-304C, respectively.

In one embodiment, prior to landing of the aircraft 302, at location 306A, the aircraft 302 sends the data associated with scheduled turnaround activity related to the aircraft 302 to one or more ground handling units in the airport 304A. For example, the data associated with scheduled turnaround activity related to the aircraft 302 may be sent 30 minutes prior to landing of the aircraft 302. The ground handling units may then modify scheduled start and end time stamps for the scheduled turnaround activities based on the received data. In one example, the ground handling units may modify the scheduled start and end time stamps for the scheduled turnaround activities using the configuration module (now shown in the figures). In addition, the configuration module may be used to configure the scheduled turnaround activities by modifying templates for the scheduled turnaround activities, a list of the scheduled turnaround activities, scheduled start and end time stamps for the scheduled turnaround activities, interdependence between the scheduled turnaround activities, and source of obtaining start and/or end time stamps associated with each scheduled turnaround activity.

After arrival of the aircraft 302 in the airport 304A, the aircraft on-board system 114 may monitor the start and end time stamps for each turnaround scheduled activity. The start and end time stamps may be sent to the analytics module 102 for determining the time deviation from the scheduled turnaround activities. Subsequently, the time deviation and the data related to the scheduled turnaround activity are sent to one or more user interfaces 106. The one or more user interfaces 106 may present the time deviation along with the data related to the turnaround scheduled activities. The presentation of time deviation along with the data related to the scheduled turnaround activities helps one or more users to reschedule the various turnaround activities, such as rescheduling of takeoff time of the aircraft 302. Similarly, at the airports 304B and 304C, the aircraft on-board system 114 may monitor the start and end time stamps for each scheduled turnaround activity.

Figure 4:
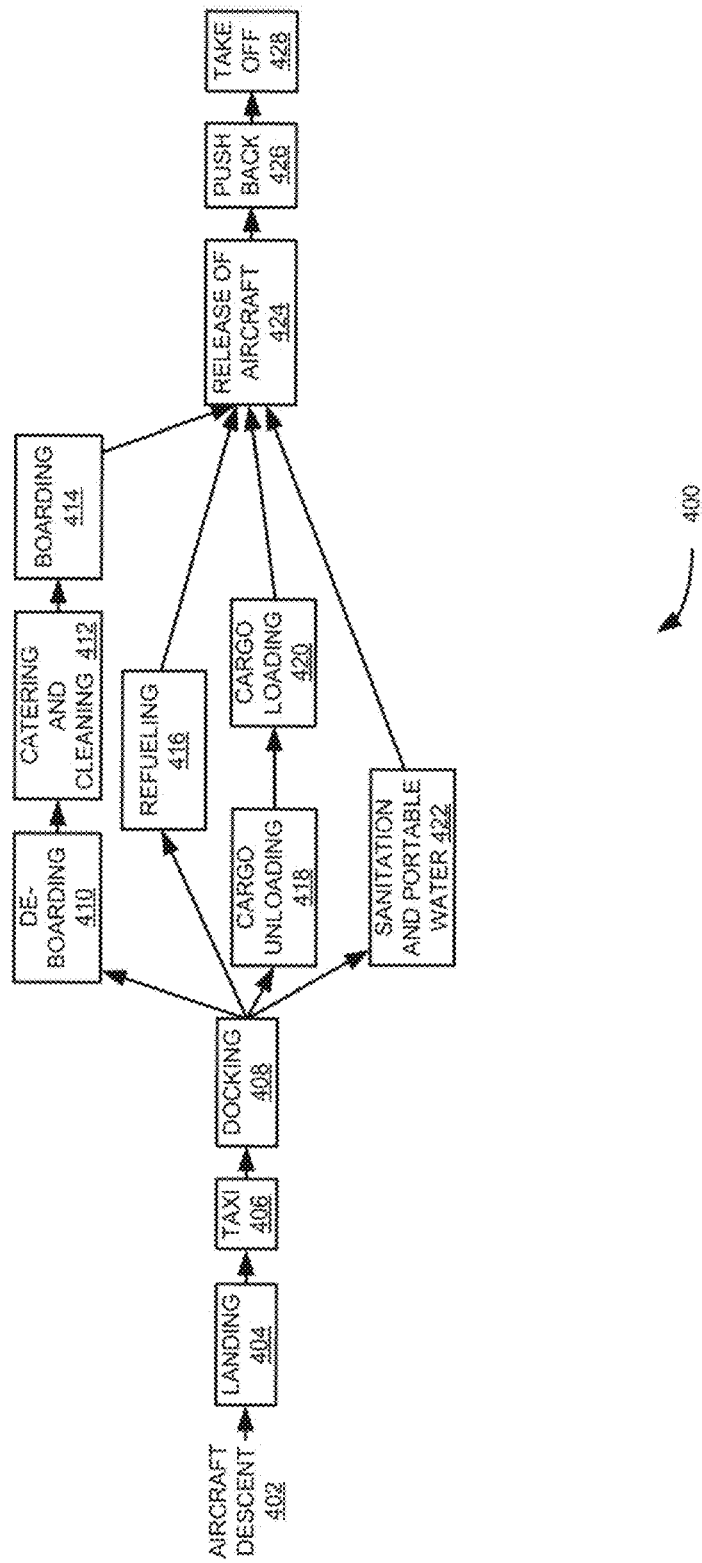
FIG. 4 illustrates a block diagram showing an example sequence of scheduled turnaround activities from touchdown to takeoff of the aircraft.

Referring now to FIG. 4, which illustrates an exemplary block diagram 400 showing a sequence of scheduled turnaround activities from touchdown to takeoff of the aircraft, according to one embodiment. The scheduled turnaround activities include an aircraft descent 402, landing 404, taxi 406, docking 408, de-boarding 410, catering and cleaning 412, boarding 414, refueling 416, cargo unloading 418, cargo loading 420, sanitation and portable water 422, release of aircraft 424, push back 426, and takeoff 428.

The scheduled turnaround activities, such as landing 404, taxi 406 and docking 408 are scheduled to be performed one after another respectively, after the aircraft descent 402. Further, the turnaround activities, such as de-boarding 410, cargo unloading 418, and sanitation/toilet servicing and portable water 422 are scheduled to be performed in parallel. For example, the de-boarding 410, the cargo unloading 418, and the sanitation/toilet servicing and portable water 422 are performed by different ground handling units and hence may be performed in parallel. Furthermore, the refueling 416 is performed after the de-boarding 410 is completed. In addition, the turnaround activities, such as catering and cleaning 412, and boarding 414 are scheduled to be performed one after another, after de-boarding 410. Also, cargo loading 420 is scheduled after cargo unloading 418. Moreover, after the completion of the scheduled turnaround activities, such as boarding 414, refueling 416, cargo loading 420 and sanitation and portable water 422, the release of the aircraft 424 is scheduled to be performed. Also, after the release of the aircraft 424, the push back 426 and take off 428 are scheduled to be performed. Similarly, all other scheduled turnaround activities are scheduled based on the time taken for each scheduled turnaround activity, ground handling units used for performing the scheduled turnaround activities and availability of ground handling units to perform the scheduled turnaround activities.

Figure 5:
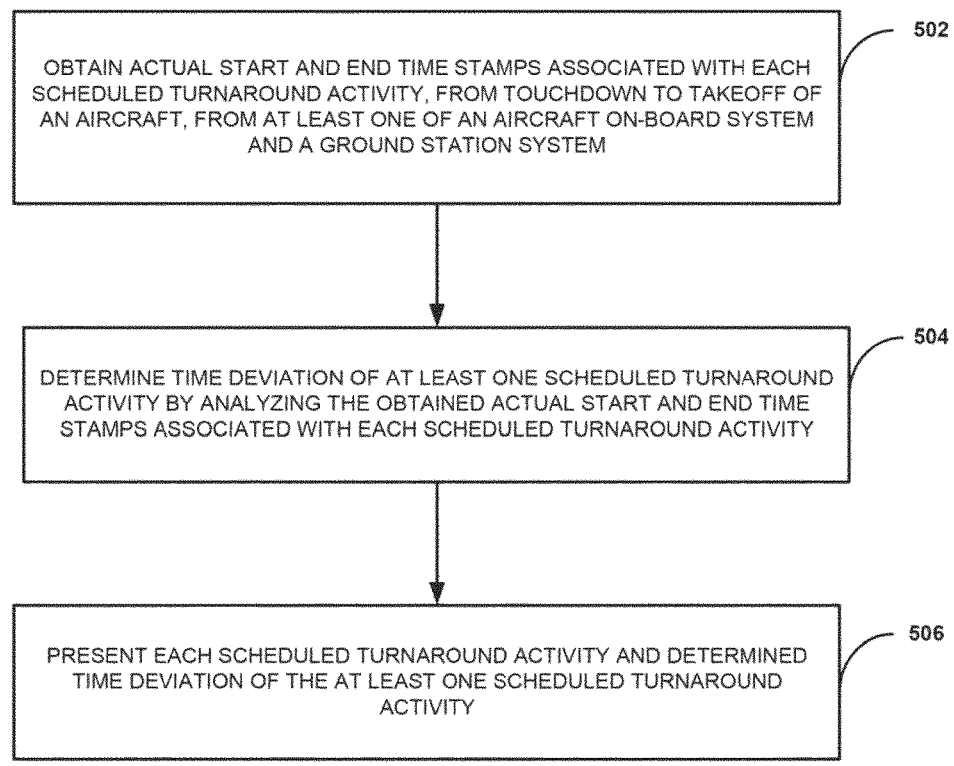
FIG. 5 illustrates an example method of monitoring scheduled turnaround activities and alerting on time deviation of the scheduled turnaround activities.

FIG. 5 illustrates a flow diagram 500 for monitoring scheduled turnaround activities and alerting on time deviation of the scheduled turnaround activities, according to one embodiment. At step 502, actual start and end time stamps associated with each scheduled turnaround activity may be obtained. The actual start and end time stamps may be obtained from at least one of an aircraft on-board system and a ground station system from touchdown to takeoff of an aircraft. At step 504, time deviation of the one or more scheduled turnaround activities may be determined. The time deviation may be determined by analyzing the obtained and scheduled start and end time stamps. In one example, the actual start and end time stamps of each turnaround activity may be compared with scheduled start and end time stamps of each scheduled turnaround activity to determine the time deviation of the one or more scheduled turnaround activities. At 506, the scheduled turnaround activity may be presented on at least one user interface.

Now, example graphical representations on a user interface to describe examples of monitoring scheduled turnaround activities and alerting on time deviation of the scheduled turnaround activities is provided with reference to FIGS. 6 to 19.

Figure 6:
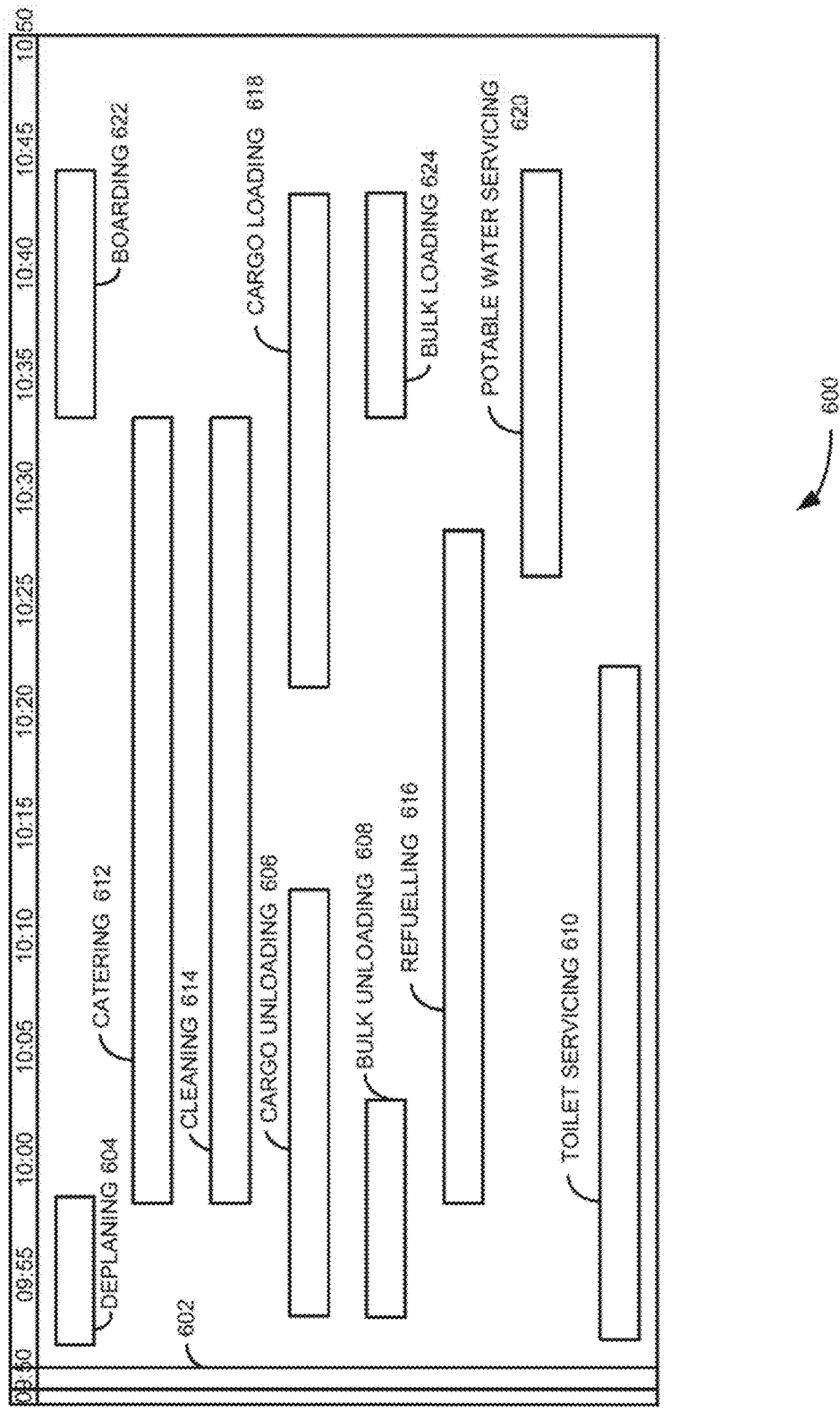
FIG. 6 to FIG. 19 illustrate example graphical representation to show scheduled turnaround activities and time deviation of scheduled turnaround activities, according to one embodiment.

FIG. 6 illustrates an example graphical representation 600 of scheduled turnaround activities to be performed. In this example, the scheduled turnaround activities to be performed are deplaning, cargo unloading, bulk unloading, toilet servicing, catering, cleaning, refueling, cargo loading, portable water servicing, boarding, and bulk loading. As shown in FIG. 6, an indicator 602 indicates current status of the scheduled turnaround activities. In this example, some scheduled turnaround activities are scheduled to be performed sequentially and some are scheduled to be performed parallelly. For example, the deplaning is scheduled to be start in between 9:50 and 9:55, and scheduled to be end in between 9:55 and 10:00 (e.g., at block 604). The cargo unloading is scheduled to be start in between 9:50 and 9:55, and scheduled to be end in between 10:10 and 10:15 (e.g., at block 606). The bulk unloading is scheduled to be start in between 9:50 and 9:55, and scheduled to be end in between 10:00 and 10:05 (e.g., at block 608). The toilet servicing is scheduled to be start in between 9:50 and 9:55, and scheduled to be end at 10:15 (e.g., at block 610). The catering is scheduled to be start in between 9:55 and 10:00, and scheduled to be end in between 10:30 and 10:35 (e.g., at block 612). The cleaning is scheduled to be start in between 9:55 and 10:00, and scheduled to be end in between 10:30 and 10:35 in parallel to the catering (e.g., at block 614). The refueling is scheduled to be start in between 9:55 and 10:00, and scheduled to be end in between 10:25 and 10:30 (e.g., at block 616). The cargo loading is scheduled to be start in between 10:20 and 10:25, and scheduled to be end in between 10:40 and 10:45 (e.g., at block 618). The portable water servicing is scheduled to be start in between 10:25 and 10:30, and scheduled to be end at 10:45 (e.g., at block 620). The boarding is scheduled to be start in between 10:30 and 10:35, and scheduled to be end at 10:45 (e.g., at block 622). Similarly, the bulk loading is scheduled to be start in between 10:30 and 10:35, and scheduled to be end in between 10:40 and 10:45 (e.g., at block 624).

Figure 7:
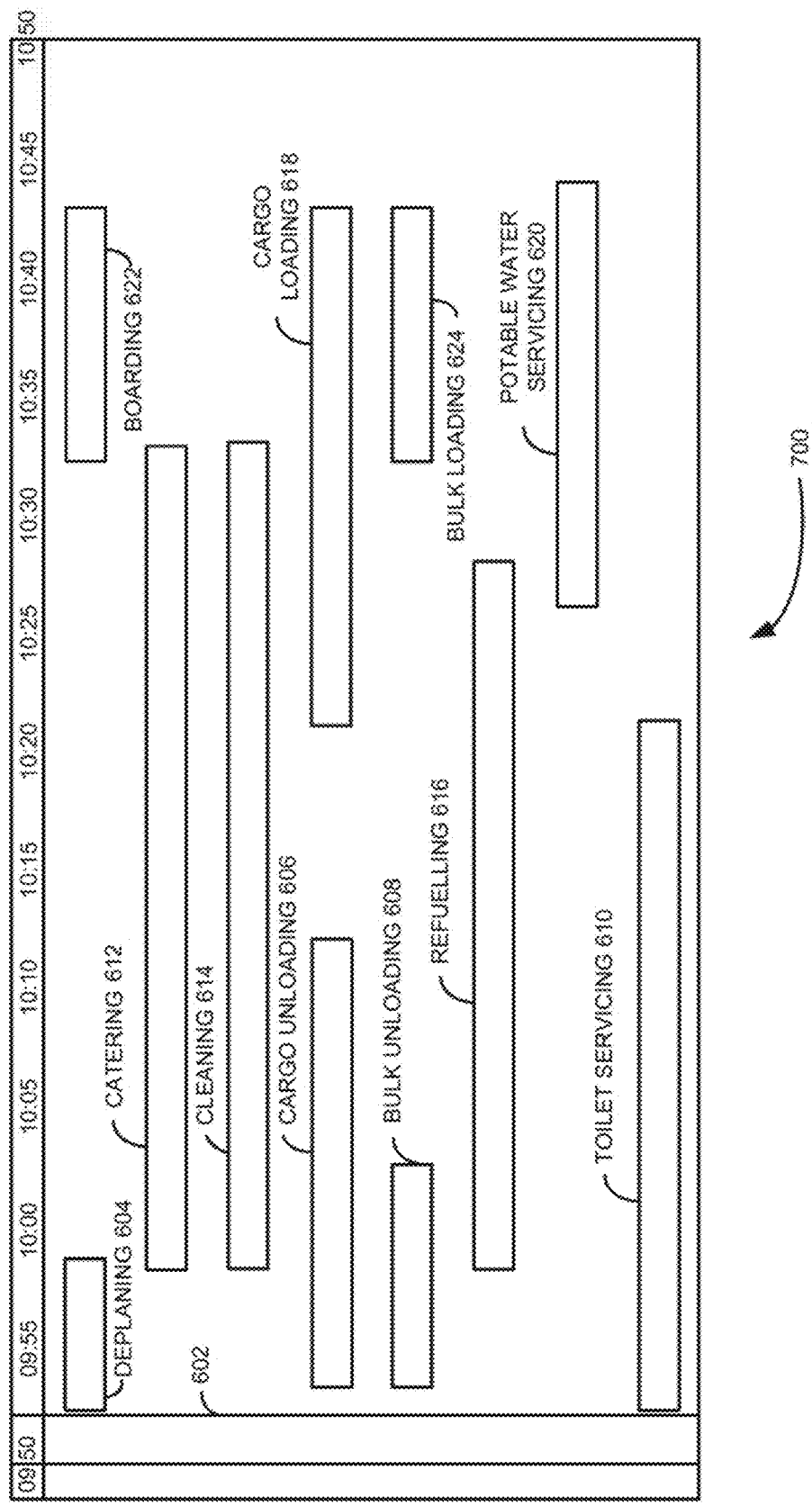
Figure 8:
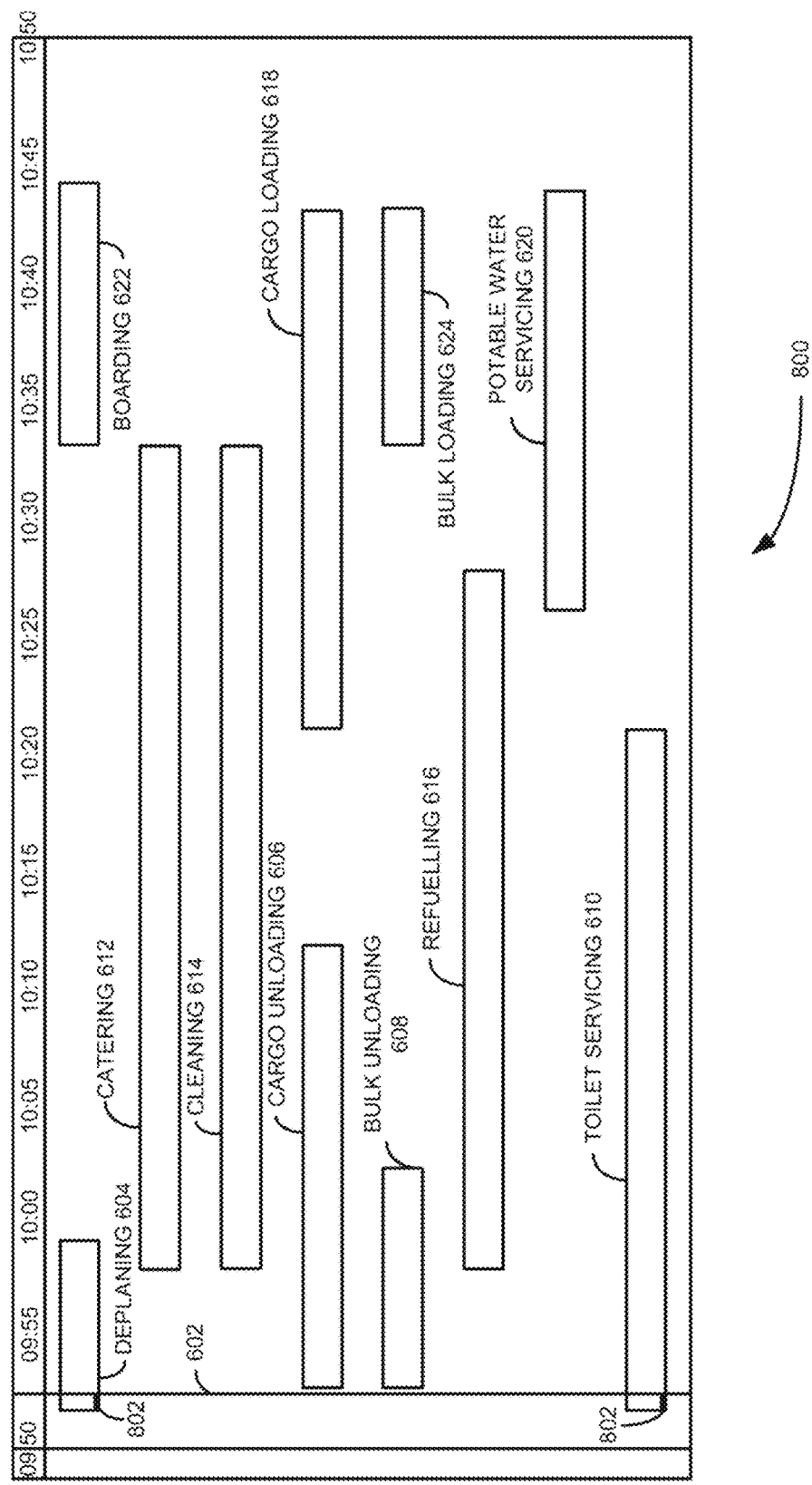
Figure 9:
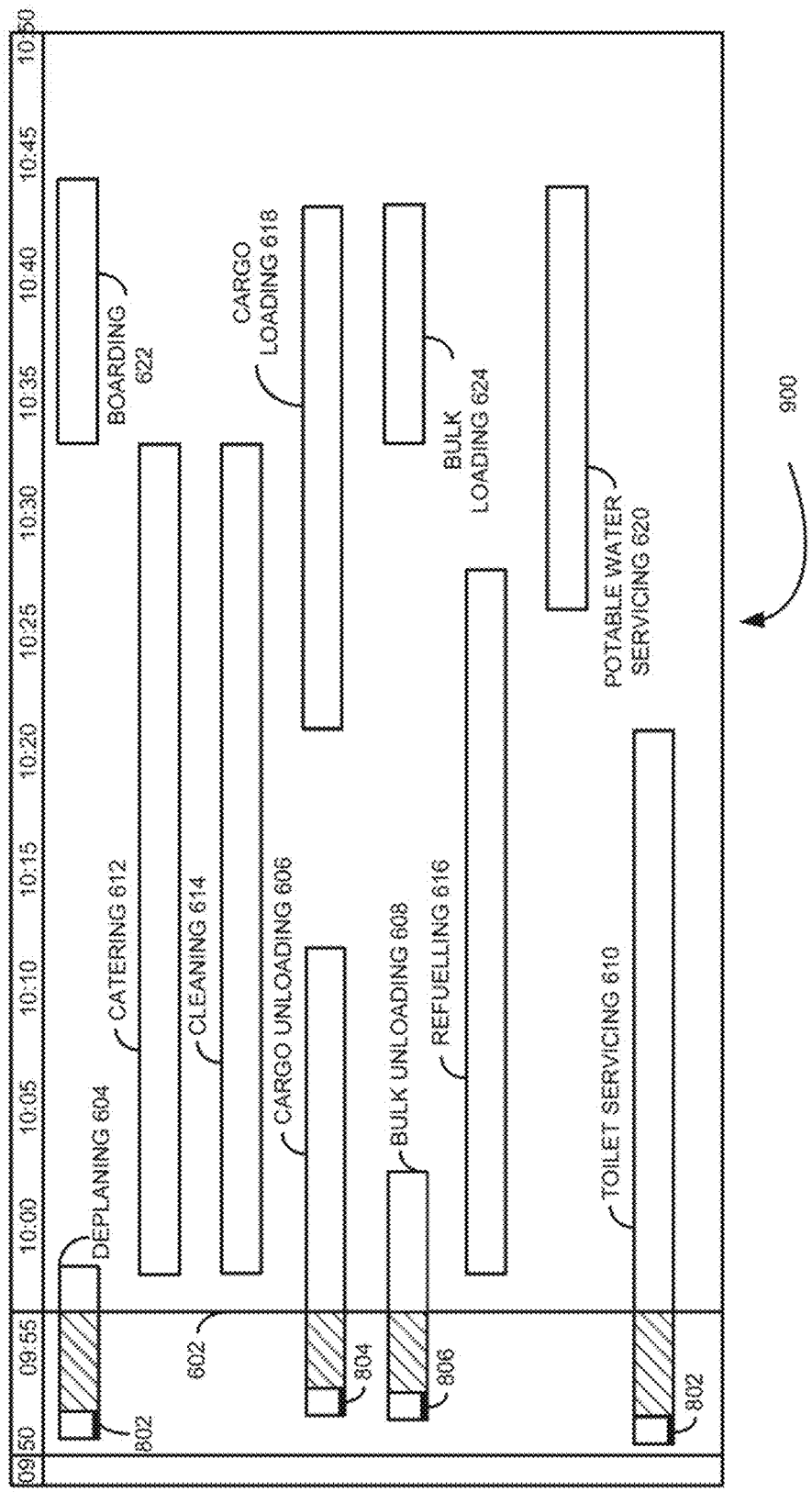
Figure 10:
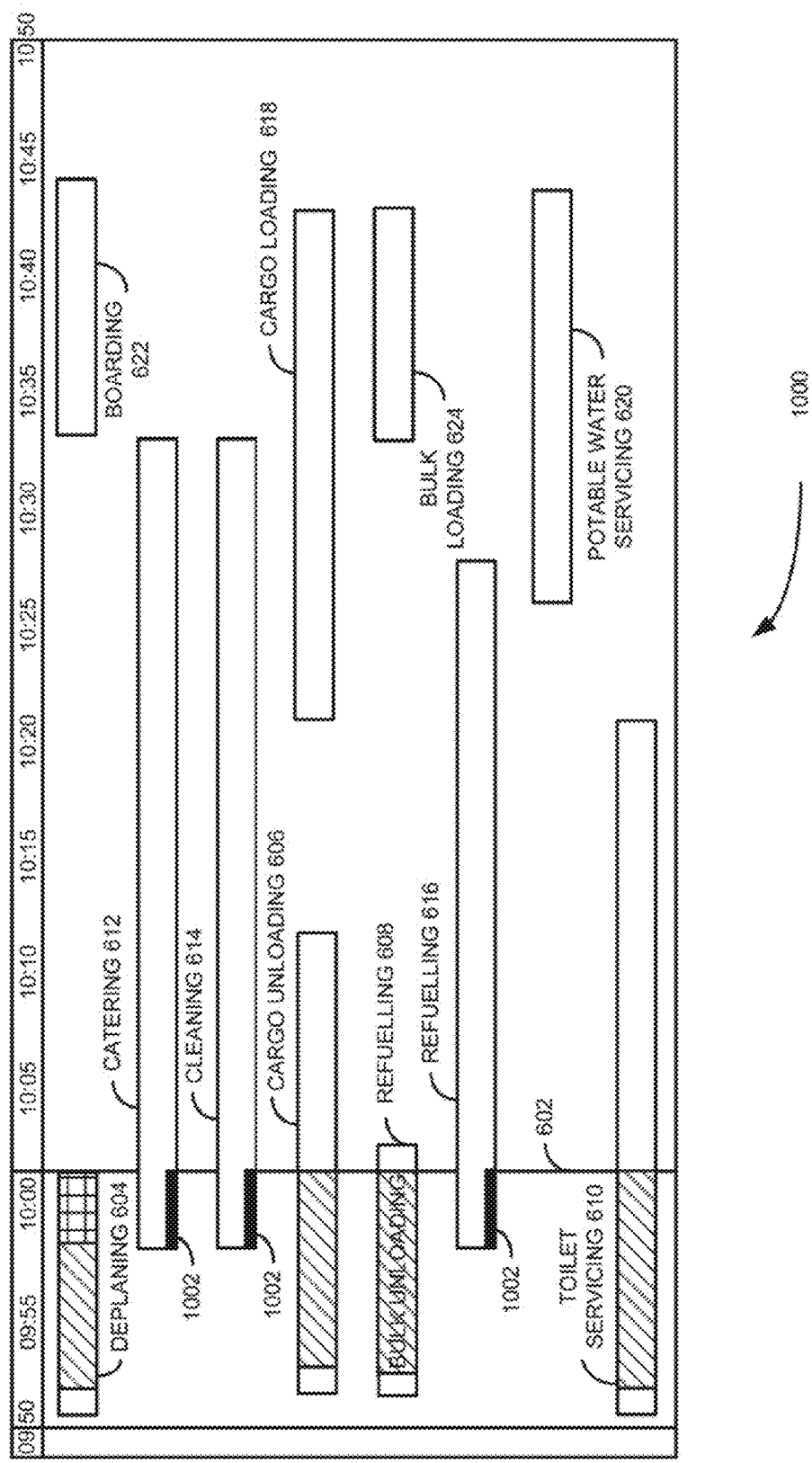

Referring now to FIG. 7 which a graphical representation 700 illustrating that the deplaning and toilet servicing are started simultaneously at a time in between 9:50 and 9:55 after arrival of the aircraft at the airport. FIG. 8 graphical representation 800 illustrating that the deplaning and toilet servicing are delayed by a time span 802. The delay may be due to several factors, such as lack of personnel to perform the scheduled turnaround activities. FIG. 9 a graphical representation 900 illustrating that deplaning and toilet servicing are started at the same time and after scheduled time for those scheduled turnaround activities. The deplaning and toilet servicing are delayed by the time span 802, as illustrated in FIG. 9. Due to the delay in deplaning, the cargo handling and bulk unloading is also delayed by time spans 804 and 806 respectively, since all the scheduled turnaround activities are interdependent to each other. FIG. 10 a graphical representation 1000 illustrating that the deplaning is continued even after scheduled end time (scheduled in between 9:55 and 10:00). Also, the catering, cleaning, and refueling are not started at their scheduled starting time and are delayed by a time span 1002.

Figure 11:
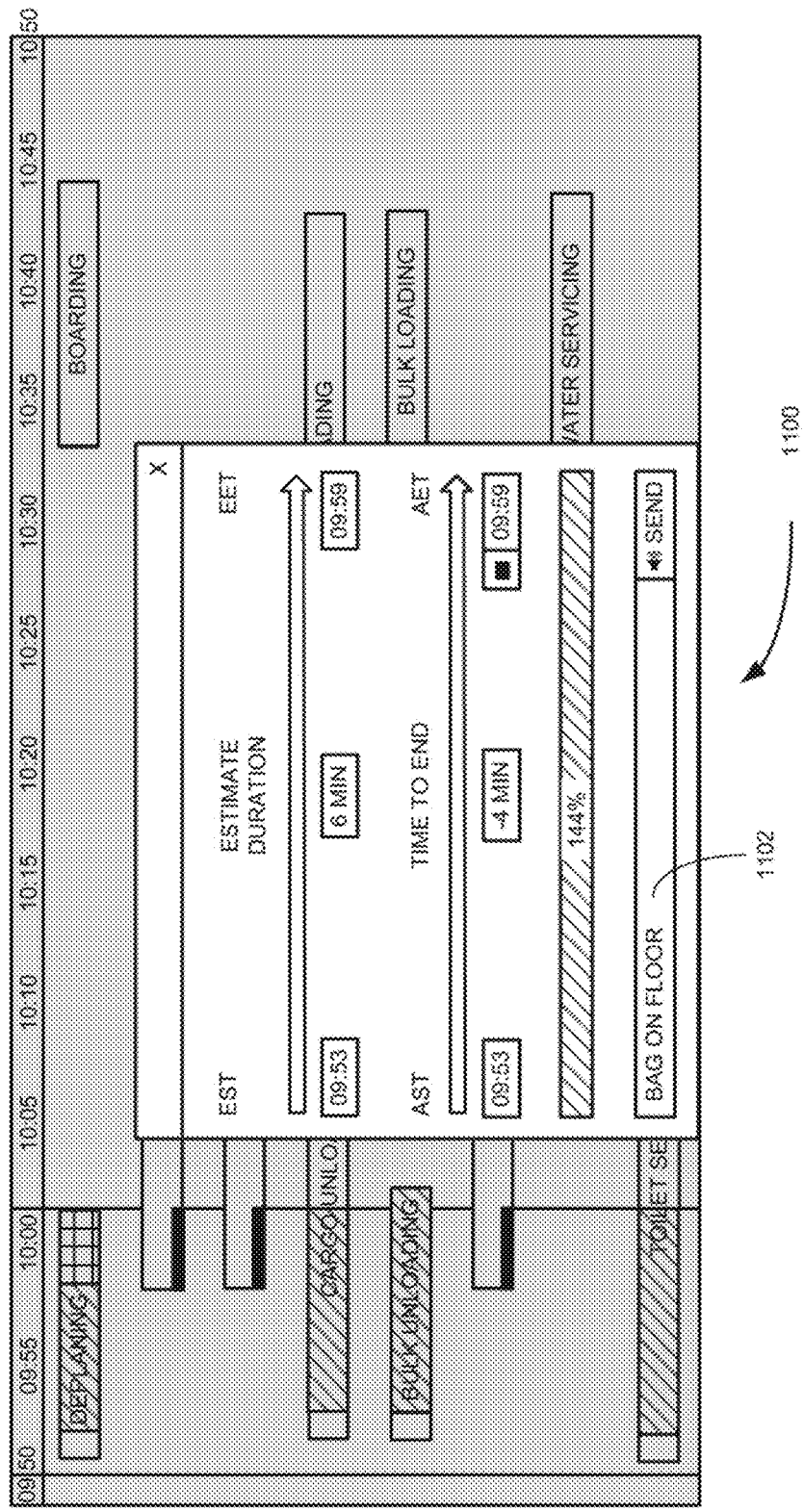
Figure 12:
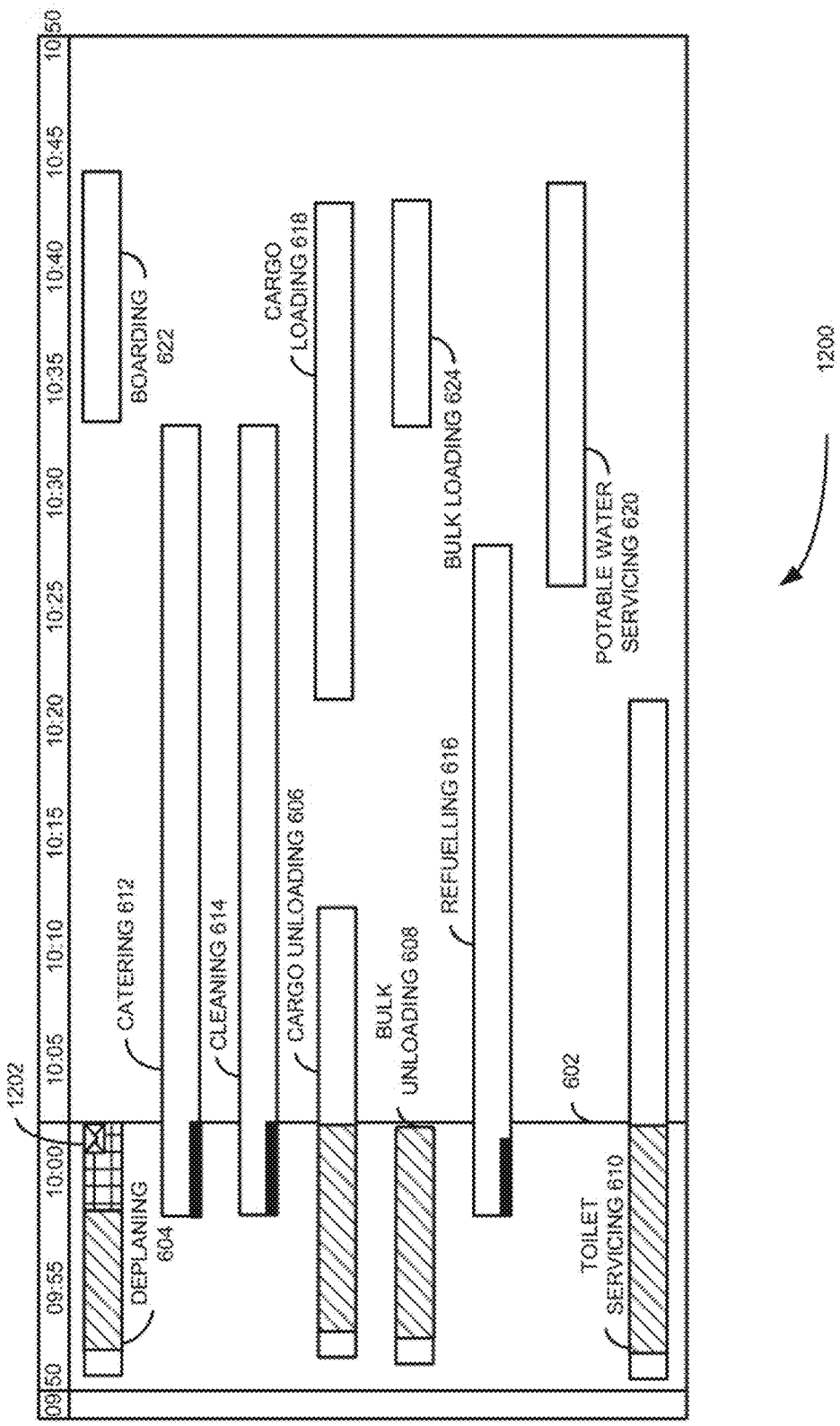

Further, FIG. 11 illustrates a user interface 1100 through which a user may enter a message and send it to other users. The user interface 1100 may include a field 1102 for writing the message. For example, the user may send the message including information that delay in deplaning is due to a bag on floor of the aircraft. FIG. 12 illustrates a user interface 1200 which shows that there is a message 1202 for deplaning. In one example, the message 1202 may indicate the cause of delay in the scheduled turnaround activities, such as deplaning in current example. In some embodiments, the message 1202 may be related to any scheduled turnaround activities, such as catering, cleaning, cargo unloading, bulk unloading, and the like.

Figure 13:
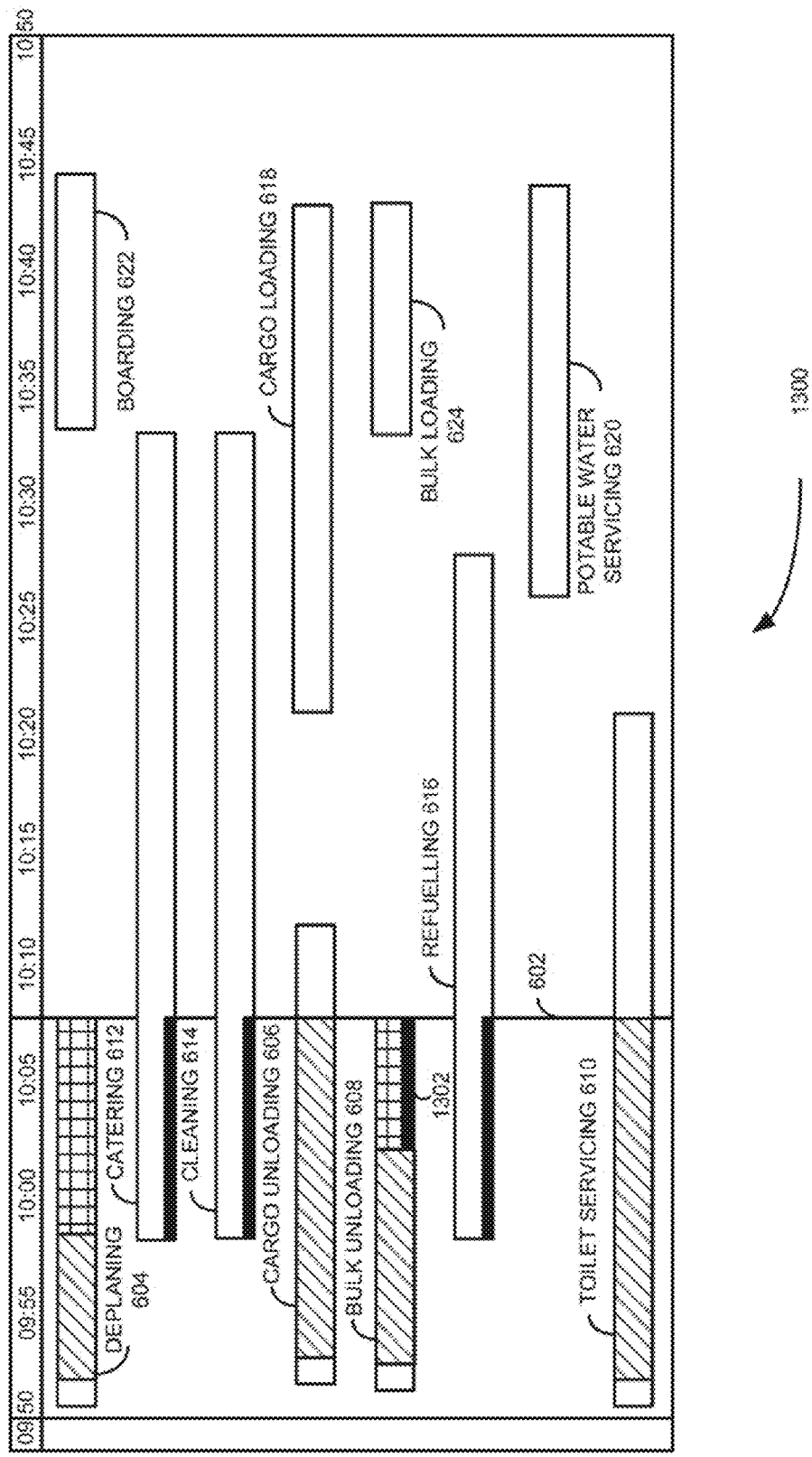
Figure 14:
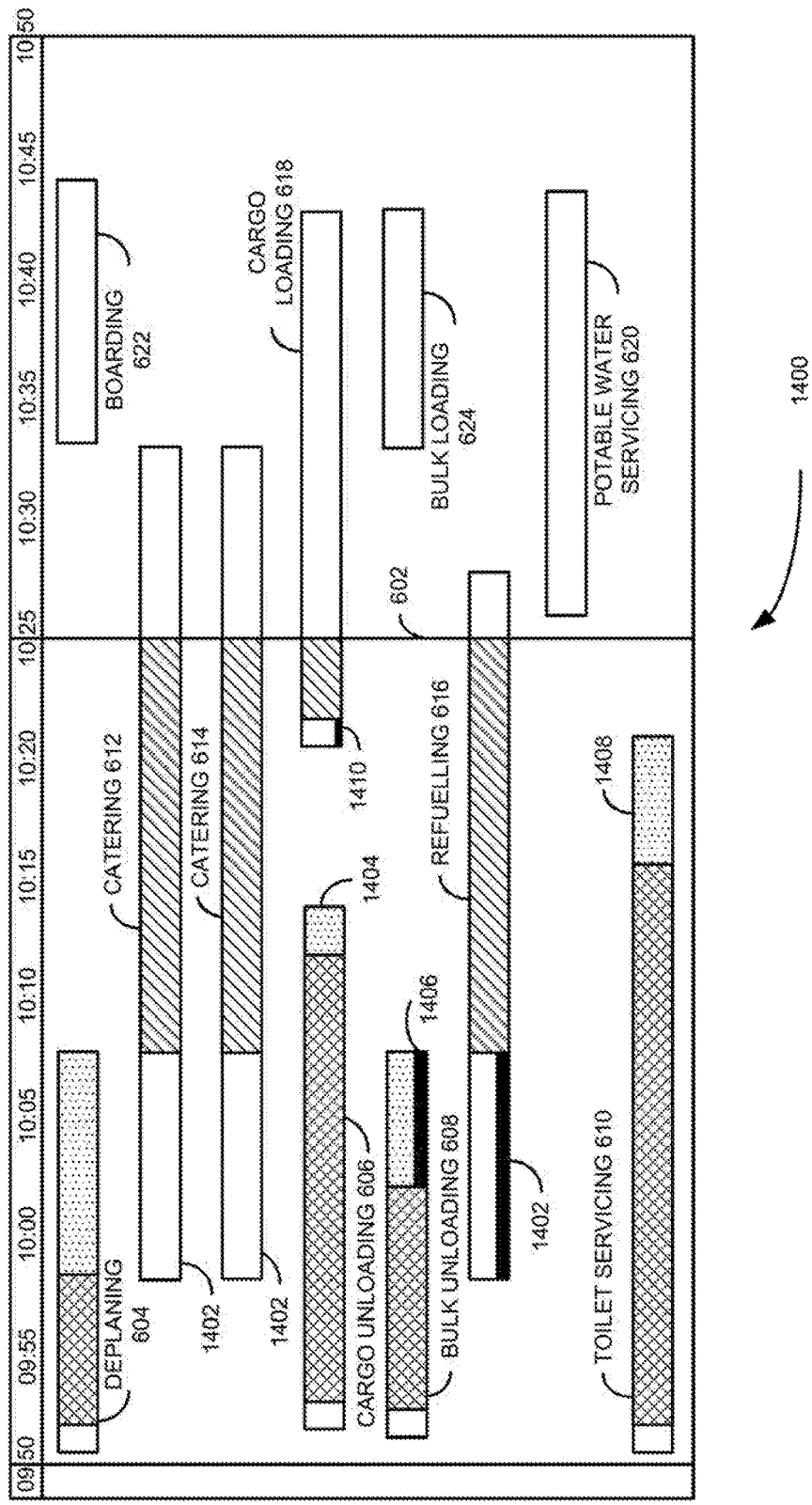
Figure 15:
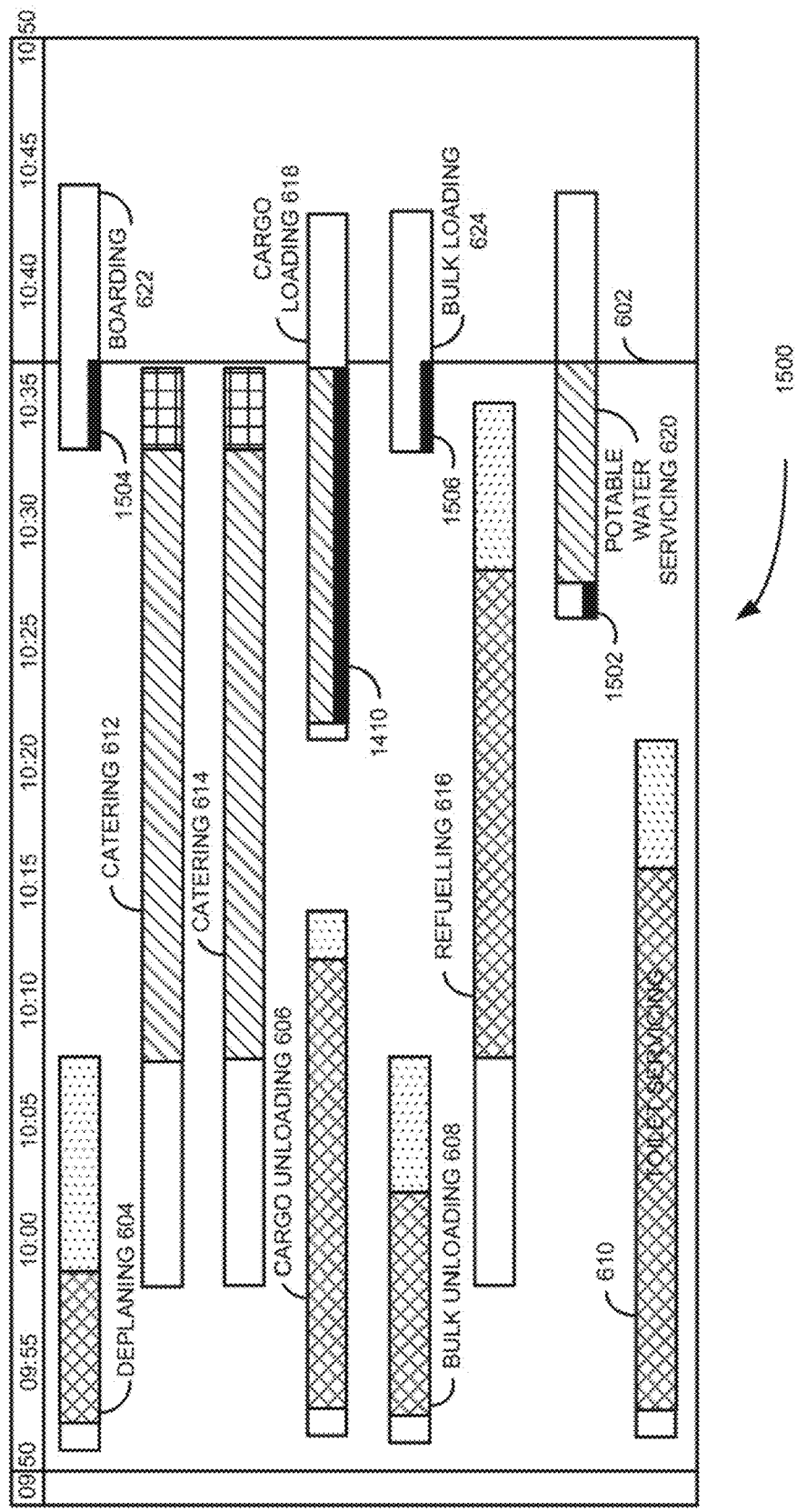

FIG. 13 a graphical representation 1300 illustrating that bulk unloading is delayed by a time span 1302. The delay in bulk unloading may be due to several factors, for example shortage of staff and/or delay in some other scheduled turnaround activities. Referring now to FIG. 14 which a graphical representation 1400 illustrating that the catering, cleaning, and refueling are started after a delay 1402 from the scheduled start time (between 9:55 and 10:00). Also, the cargo unloading, bulk unloading, and the toilet servicing are stopped after delays 1404, 1406, and 1408 respectively. Further, cargo handling is started after a delay 1410 in scheduled start time (between 10:20 and 10:25). FIG. 15 a graphical representation 1500 illustrating that the portable water servicing is delayed due to a delay 1502 in scheduled start time (between 10:25 and 10:30) for the portable water servicing. Also, there is a delay 1504 in start of boarding (scheduled to start in between 10:30 and 10:35) and a delay 1506 in start of bulk loading due to the delays in deplaning, catering, cleaning, cargo unloading, bulk unloading, toilet servicing, refueling, and cargo handling.

Figure 16:
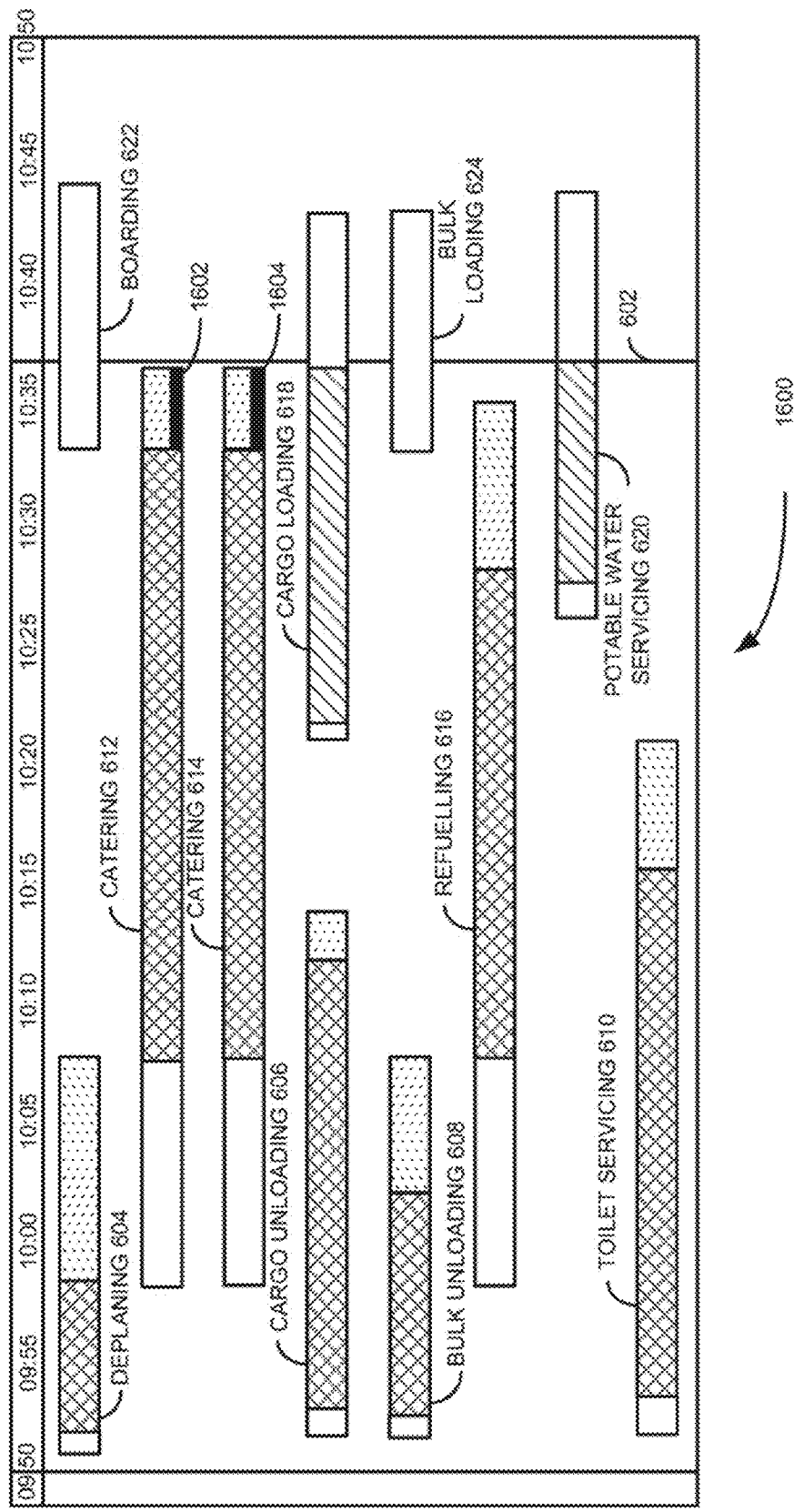
Figure 17:
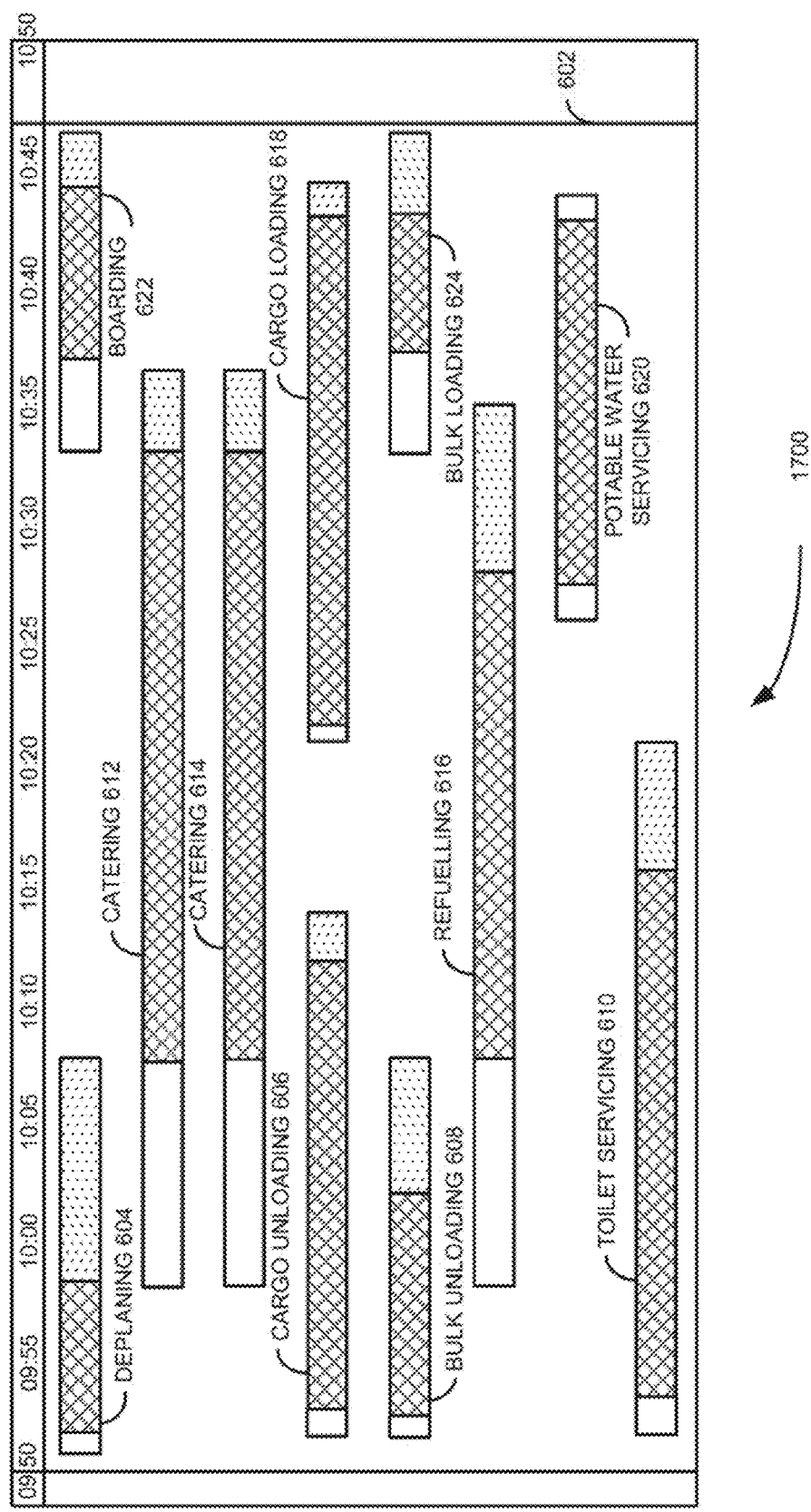

FIG. 16 a graphical representation 1600 illustrating that cleaning and catering are finished with delays 1602 and 1604 respectively in their respective scheduled start time. FIG. 17 a graphical representation 1700 illustrating that boarding is scheduled to be end at 10:45, however, it is being delayed due to delay in scheduled turnaround activities which were scheduled to be completed before scheduled start time of the boarding. Also, the portable water servicing is finished before the scheduled end time.

Figure 18:
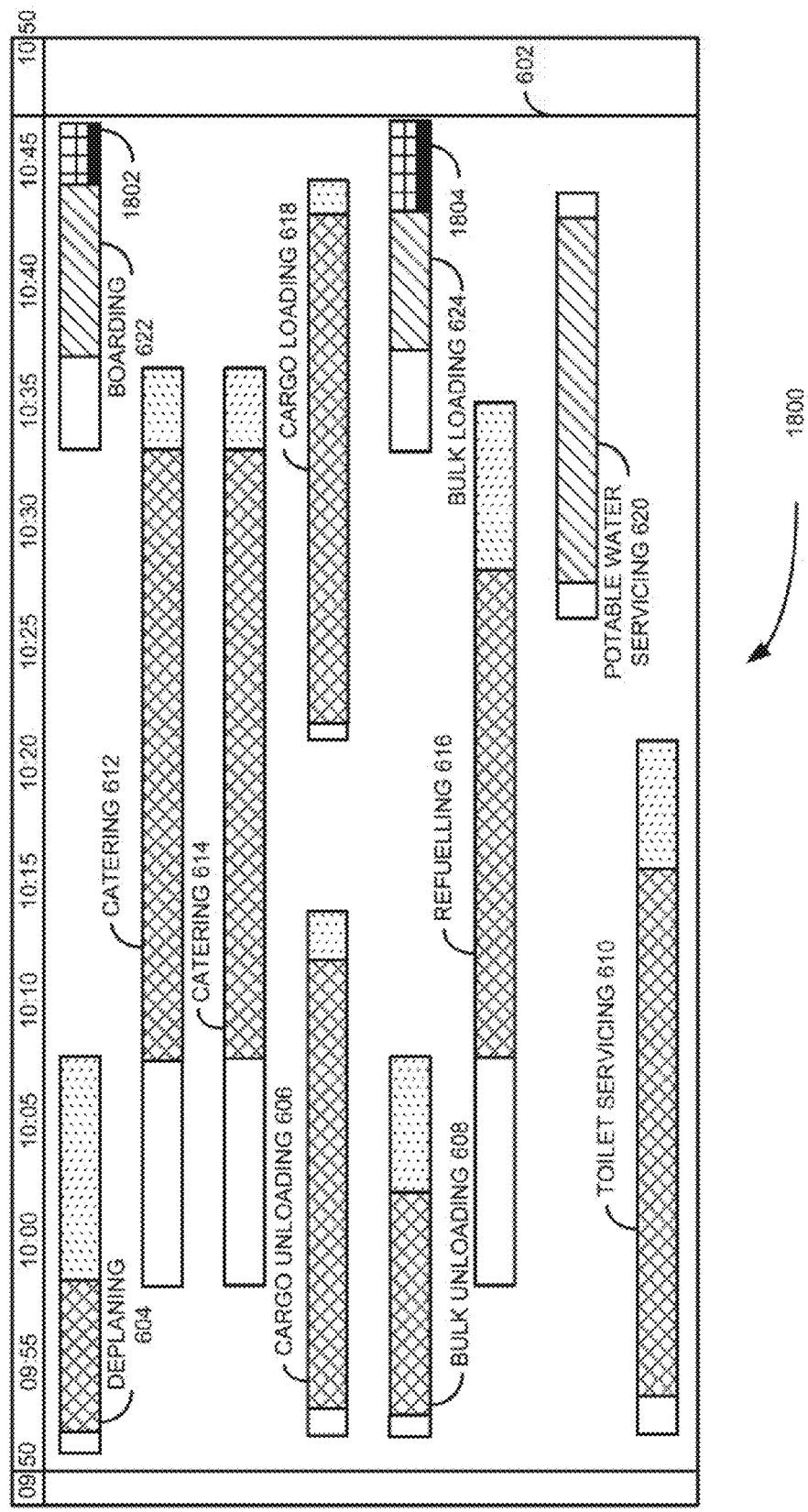
Figure 19:
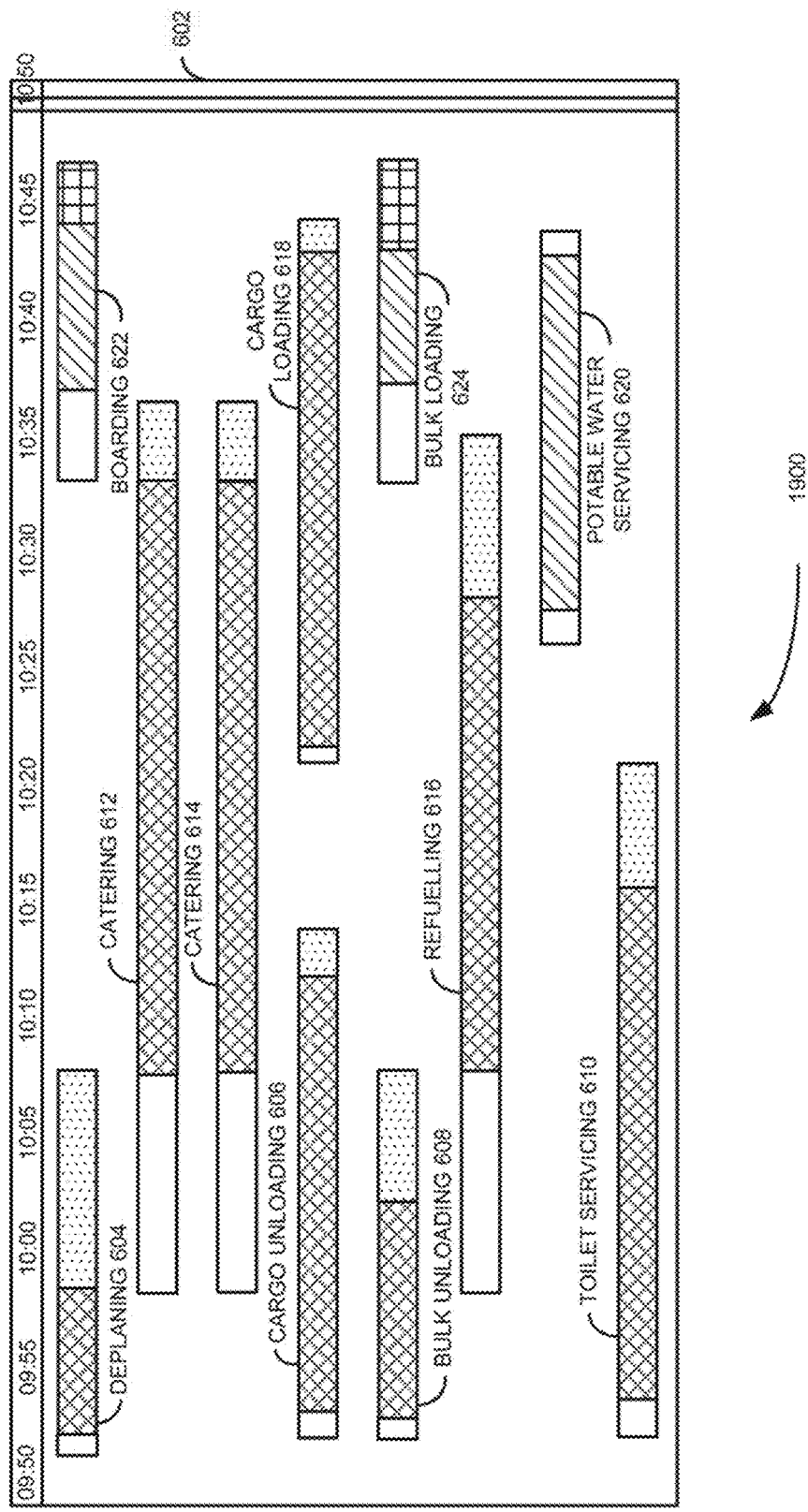

Referring now to FIG. 18 which a graphical representation 1800 illustrating that the boarding and the bulk loading are ended with a delay 1802 and 1804 respectively. Further, FIG. 19 a graphical representation 1900 illustrating that takeoff time for the aircraft is delayed due to delay in the completion of the scheduled turnaround activities.

Figure 20:
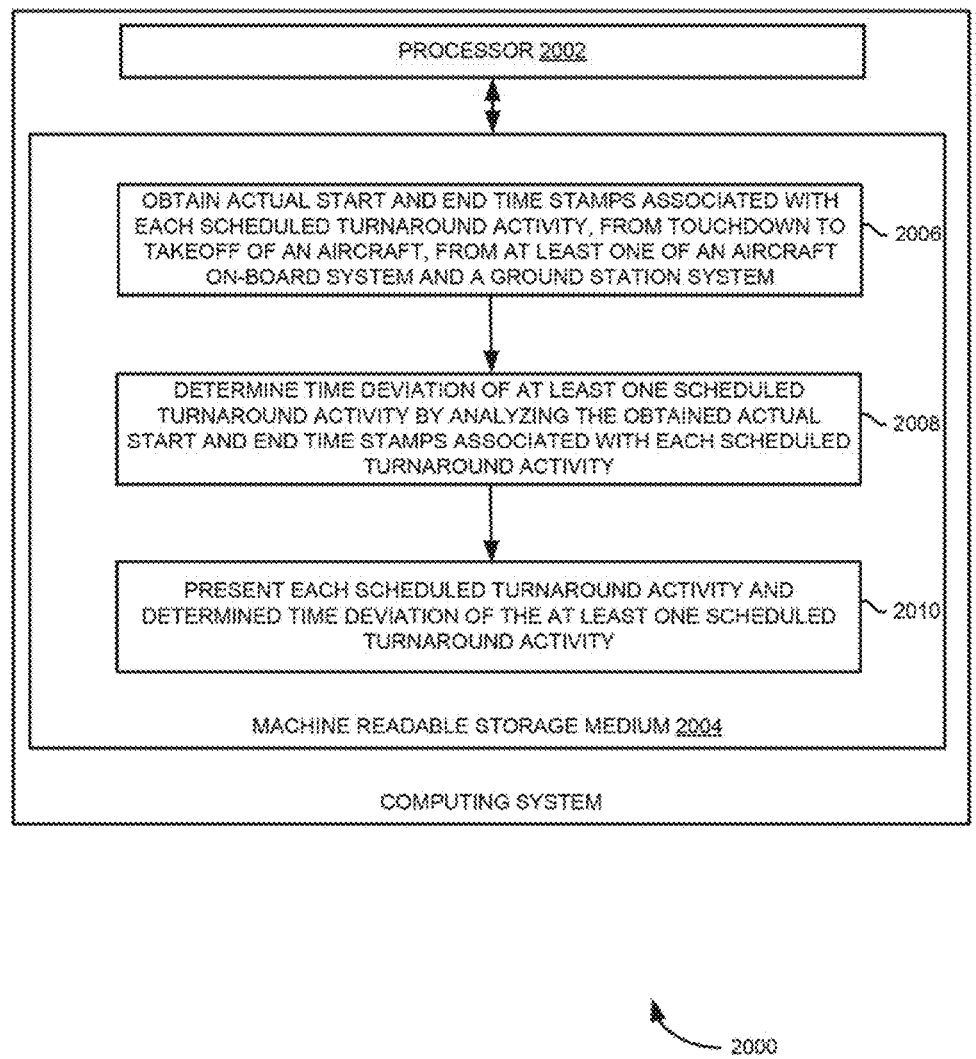
FIG. 20 illustrates an example block diagram showing a non-transitory, computer-readable medium that stores instructions for monitoring scheduled turnaround activities and alerting on time deviation of the scheduled turnaround activities.

Referring to FIG. 20 which illustrates an example block diagram showing a non-transitory, computer-readable medium that stores instructions for monitoring scheduled turnaround activities and alerting on time deviation of the scheduled turnaround activities.

FIG. 20 is an example block diagram showing a non-transitory, computer-readable medium that stores code for operation in accordance with an example of the techniques of the present application. The non-transitory, computer-readable medium is generally referred to by the reference number 2000 and may be included in the system in relation to FIG. 1. The non-transitory, computer-readable medium 2000 may correspond to any typical storage device that stores computer-implemented instructions, such as programming code or the like. For example, the non-transitory, computer-readable medium 2000 may include one or more of a non-volatile memory, a volatile memory, and/or one or more storage devices. Examples of non-volatile memory include, but are not limited to, electrically erasable programmable Read Only Memory (EEPROM) and Read Only Memory (ROM). Examples of volatile memory include, but are not limited to, Static Random Access Memory (SRAM), and dynamic Random Access Memory (DRAM). Examples of storage devices include, but are not limited to, hard disk drives, compact disc drives, digital versatile disc drives, optical drives, and flash memory devices.

A processor 2002 generally retrieves and executes the instructions stored in the non-transitory, computer-readable medium 2000 to operate the present techniques in accordance with an example. In one example, the tangible, computer-readable medium 2000 can be accessed by the processor 2002 over a bus.

For example, block 2006 provides instructions which may include instructions to initiate a process for monitoring scheduled turnaround activities, as described herein. In one example, the instructions may include instructions to initiate a process for monitoring scheduled turnaround activities and alerting on time deviation of the scheduled turnaround activities by obtaining actual start and end time stamps associated with each scheduled turnaround activity, from touchdown to takeoff of an aircraft, from at least one of an aircraft on-board system and a ground station system, as described herein.

For example, block 2008 provides instructions which may include instructions to determine time deviation of the at least one scheduled turnaround activity, as described herein. In one example, the instructions may include instructions to determine time deviation of the at least one scheduled turnaround activity by analyzing the obtained actual start and end time stamps associated with each scheduled turnaround activities, as described herein.

For example, block 2010 provides instructions which may include instructions to present each scheduled turnaround activity and determined time deviation of the at least one scheduled turnaround activity, as described herein.

Although shown as contiguous blocks, the software components can be stored in any order or configuration. For example, if the non-transitory, computer-readable medium 2004 is a hard drive, the software components can be stored in non-contiguous, or even overlapping, sectors.

As used herein, a "processor" may include processor resources such as at least one of a Central Processing Unit (CPU), a semiconductor-based microprocessor, a Graphics Processing Unit (GPU), a Field-Programmable Gate Array (FPGA) configured to retrieve and execute instructions, other electronic circuitry suitable for the retrieval and execution instructions stored on a computer-readable medium, or a combination thereof. The processor fetches, decodes, and executes instructions stored on medium 2004 to perform the functionalities described below. In other examples, the functionalities of any of the instructions of medium 2004 may be implemented in the form of electronic circuitry, in the form of executable instructions encoded on a computer-readable storage medium, or a combination thereof.

As used herein, a "computer-readable medium" may be any electronic, magnetic, optical, or other physical storage apparatus to contain or store information such as executable instructions, data, and the like. For example, any computer-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable medium described herein may be non-transitory. In examples described herein, a computer-readable medium or media is part of an article (or article of manufacture). An article or article of manufacture may refer to any manufactured single component or multiple components. The medium may be located either in the system executing the computer-readable instructions, or remote from but accessible to the system (e.g., via a computer network) for execution. In the example of FIG. 20, medium 2004 may be implemented by one computer-readable medium, or multiple computer-readable media.

In some examples, instructions may be part of an installation package that, when installed, may be executed by processor 2002 to implement the functionalities described herein in relation to instructions. In such examples, medium 2004 may be a portable medium, such as a CD, DVD, or flash drive, or a memory maintained by a server from which the installation package can be downloaded and installed. In other examples, instructions may be part of an application, applications, or component(s) already installed on the host/client device including processor 2002. In such examples, the medium 2004 may include memory such as a hard drive, solid state drive, or the like. In some examples, functionalities described herein in relation to FIGS. 1 through 20 may be provided in combination with functionalities described herein in relation to any of FIGS. 1 through 20.

The foregoing describes a novel and previously unforeseen approach for storage management. While the above application has been shown and described with reference to the foregoing examples, it should be understood that other forms, details, and implementations may be made without departing from the spirit and scope of this application.

What is claimed is:

1. A system for monitoring scheduled turnaround activities and alerting on time deviation from the scheduled turnaround activities, comprising:
   a ground station system;
   an aircraft on-board system; and
   a cloud communicatively coupled to the ground station computing system and the aircraft on-board system, the cloud comprises:
   at least one processor; and
   memory coupled to the processor, the memory comprises an analytics module to:
   obtain actual start and end time stamps associated with each scheduled turnaround activity, from touchdown to takeoff of an aircraft, from at least one of the aircraft on-board system and the ground station system, wherein the scheduled turnaround activities comprise ground handling activities and aircraft activities; and
   determine time deviation of at least one scheduled turnaround activity by comparing the obtained actual start and end time stamps with scheduled start and end time stamps associated with each scheduled turnaround activity; and
   at least one user interface to present each scheduled turnaround activity and determined time deviation of the at least one scheduled turnaround activity.

2. The system of claim 1, wherein the analytics module comprising:
   an alert generation module configured to generate an alert upon time deviation of the scheduled turnaround activities.

3. The system of claim 1, further comprising:
   a configuration module to configure the scheduled turnaround activities to be performed based on the at least one of airline operations and airport conditions.

4. The system of claim 3, wherein the configuration module configures the scheduled turnaround activities by modifying at least one of:
   templates for the scheduled turnaround activities;
   a list of the scheduled turnaround activities;
   scheduled start and end time stamps for the scheduled turnaround activities;
   interdependence between the scheduled turnaround activities; and
   source of obtaining actual start and end time stamps associated with each scheduled turnaround activity.

5. The system of claim 1, wherein the analytics module comprising:

a delay prediction module to determine an aircraft departure delay caused by the at least one scheduled turnaround activity by analyzing the time deviation.

6. The system of claim 1, wherein the ground station system comprises an airport computing system, a ground handling unit, an airline computing system.

7. A system for monitoring scheduled turnaround activities and alerting on time deviation from the scheduled turnaround activities, comprising:
   a ground station system;
   an aircraft on-board system;
   an analytics module residing in memory associated with one of the ground station system and the aircraft on-board system, the analytics module to:
   obtain actual start and end time stamps associated with each scheduled turnaround activity, from touchdown to takeoff of an aircraft, from at least one of the aircraft on-board system and the ground station system, wherein the scheduled turnaround activities comprise ground handling activities and aircraft activities; and
   determine time deviation of at least one scheduled turnaround activity by comparing the obtained actual start and end time stamps with scheduled start and end time stamps associated with each scheduled turnaround activity; and
   at least one user interface to present each scheduled turnaround activity and determined time deviation of the at least one scheduled turnaround activity.

8. The system of claim 7, wherein the analytics module comprising:
   an alert generation module configured to generate an alert upon time deviation of the scheduled turnaround activities.

9. The system of claim 2, further comprising:
   a configuration module to configure the scheduled turnaround activities to be performed based on the at least one of airline operations and airport conditions.

10. The system of claim 9, wherein the configuration module configures the scheduled turnaround activities by modifying at least one of:
    templates for the scheduled turnaround activities;
    a list of the scheduled turnaround activities;
    scheduled start and end time stamps for the scheduled turnaround activities;
    interdependence between the scheduled turnaround activities; and
    source of obtaining actual start and end time stamps associated with each scheduled turnaround activity.

11. A method for monitoring scheduled turnaround activities and alerting on time deviation of the scheduled turnaround activities, comprising:
    obtaining actual start and end time stamps associated with each scheduled turnaround activity, from touchdown to takeoff of an aircraft, from at least one of an aircraft on-board system and a ground station system, wherein the scheduled turnaround activities comprise ground handling activities and aircraft activities;
    determining time deviation of at least one scheduled turnaround activity by comparing the obtained actual start and end time stamps with scheduled start and end time stamps associated with each scheduled turnaround activity; and
    presenting each scheduled turnaround activity and determined time deviation of the at least one scheduled turnaround activity.

12. The method of claim 11, further comprising:
generating an alert, upon determining time deviation of the at least one scheduled turnaround activity.

13. The method of claim 1, wherein the time deviation of the at least one scheduled turnaround activity is determined by comparing actual stat and end time stamps of each scheduled turnaround activity with scheduled start and end time stamps of each scheduled turnaround activity.

14. The method of claim 11, wherein in presenting each scheduled turnaround activity and determined time deviation of the at least one scheduled turnaround activity comprises:
presenting each scheduled turnaround activity and determined time deviation of the at least one scheduled turnaround activity on at least one user interface.

15. The method of claim 11, wherein in presenting each scheduled turnaround activity and determined time deviation of the at least one scheduled turnaround activity comprises:
presenting each scheduled turnaround activity and determined time deviation of the at least one scheduled turnaround activity using Gantt charts.

16. A method for monitoring scheduled turnaround activities and alerting on time deviation of the scheduled turnaround activities, comprising:
obtaining actual start and end time stamps associated with each scheduled turnaround activity, from touchdown to takeoff of an aircraft, from at least one of an aircraft on-board system and a ground station system, wherein the scheduled turnaround activities comprise ground handling activities and aircraft activities, wherein the ground handling activities comprise refueling, cargo loading, cargo unloading, catering and cleaning, toilet drain cycle and portable water filling, and wherein the aircraft activities comprise touchdown, braking start, brake fans start, brake fans stop, braking release, parking brake on, engine stop, aircraft arrival, aircraft docking, aircraft pull away, take off braking start, taxi speed reached, and engine stop;
determining time deviation of at least one scheduled turnaround activity by analyzing the obtained actual start and end time stamps associated with each scheduled turnaround activity; and
presenting each scheduled turnaround activity and determined time deviation of the at least one scheduled turnaround activity.

17. A non-transitory computer-readable medium having computer executable instructions stored thereon for monitoring scheduled turnaround activities and alerting on time deviation of the scheduled turnaround activities, the instructions are executable by a processor to:
obtaining actual start and end time stamps associated with each scheduled turnaround activity, from touchdown to takeoff of an aircraft, from at least one of an aircraft on-board system and a ground station system, wherein the scheduled turnaround activities comprise ground handling activities and aircraft activities;
determining time deviation of at least one scheduled turnaround activity by comparing the obtained actual start and end time stamps with scheduled start and end time stamps associated with each scheduled turnaround activity; and
presenting each scheduled turnaround activity and determined time deviation of the at least one scheduled turnaround activity.

18. The non-transitory computer-readable medium of claim 17, further comprising instructions that if executed cause a processor to:
generate an alert, upon determining time deviation of the at least one scheduled turnaround activity.

19. The non-transitory computer-readable medium of claim 17, further comprising instructions that if executed cause a processor to:
compare the actual start and end time stamps of each scheduled turnaround activity with scheduled start and end time stamps of each scheduled turnaround activity to determine the time deviation of the at least one scheduled turnaround activity.

* * * * *